United States Patent
Ross et al.

(10) Patent No.: US 7,381,377 B2
(45) Date of Patent: Jun. 3, 2008

(54) METHOD FOR CONTROLLED PRODUCTION OF A GAS

(75) Inventors: Julian Ross, McKinney, TX (US); Charles R. Keyes, Jr., Athens, TX (US)

(73) Assignee: OxySure Systems, Inc., Frisco, TX (US)

( * ) Notice: Subject to any disclaimer, the term of this patent is extended or adjusted under 35 U.S.C. 154(b) by 531 days.

(21) Appl. No.: 11/159,016

(22) Filed: Jun. 22, 2005

(65) Prior Publication Data

US 2006/0292061 A1 Dec. 28, 2006

Related U.S. Application Data

(63) Continuation of application No. 11/045,805, filed on Jan. 28, 2005, now abandoned.

(51) Int. Cl.
C02F 1/72 (2006.01)
A62B 21/00 (2006.01)
A62B 7/08 (2006.01)

(52) U.S. Cl. .................. 422/120; 422/122; 422/236; 128/202.26

(58) Field of Classification Search .............. 422/120, 422/122, 236; 128/202.26
See application file for complete search history.

(56) References Cited

U.S. PATENT DOCUMENTS

| | | | |
|---|---|---|---|
| 3,702,305 A | 11/1972 | Thompson | |
| 3,725,156 A | 4/1973 | Thompson | |
| 3,733,008 A * | 5/1973 | Churchill et al. | 222/6 |
| 3,986,838 A | 10/1976 | Reichert | |
| 4,278,637 A | 7/1981 | McBride | |
| 4,292,967 A | 10/1981 | Pasternack | |
| 4,310,502 A | 1/1982 | Wagner | |
| 4,508,700 A | 4/1985 | Hoshiko | |
| 4,548,730 A | 10/1985 | Koslow | |
| 4,683,130 A | 7/1987 | Ueno et al. | |
| 5,466,391 A | 11/1995 | Shinji | |
| 5,620,664 A | 4/1997 | Palmer | |
| 5,823,181 A | 10/1998 | Shih | |

(Continued)

FOREIGN PATENT DOCUMENTS

EP 0349349 A2 1/1990

(Continued)

OTHER PUBLICATIONS

WWW.REDI-CHLOR.COM, System O2 Emergency Oxygen Kit, Dec. 2003, Cumming, IA 50061.

(Continued)

*Primary Examiner*—Jill Warden
*Assistant Examiner*—Sean E. Conley

(57) ABSTRACT

An apparatus is provided to generate a gas by mixing chemicals with water. Typically, the production of gas, particularly oxygen, by combining water with powders and other dry chemicals has not been widely employed. There have existed a number of preexisting barriers such as undesirable flow rates and yields. However, by utilizing multiple reaction chambers the flow rates and yields can be more precisely tailored for a variety of situations that may call for particular flow rates and yields. Additionally, the use of the dry chemicals would allow for a long self-life allowing the apparatus to be particularly useful in emergency situations.

13 Claims, 26 Drawing Sheets

U.S. PATENT DOCUMENTS

| | | |
|---|---|---|
| 6,123,069 A | 9/2000 | Davis |
| 6,143,251 A | 11/2000 | Beller et al. |
| 6,267,114 B1 | 7/2001 | Ueno |
| 6,319,477 B1 | 11/2001 | Du Toit |
| 6,651,658 B1 | 11/2003 | Hill et al. |
| 7,171,964 B2 * | 2/2007 | Moore et al. .......... 128/202.26 |
| 2005/0022810 A1 | 2/2005 | Moore et al. |

FOREIGN PATENT DOCUMENTS

| | | |
|---|---|---|
| WO | WO 86/02063 A1 | 4/1986 |
| WO | WO 90/11248 A1 | 10/1990 |

OTHER PUBLICATIONS

WWW.REDI-CHLOR.COM, Redi Chlor Water Purification Tablets, May 12, 2001, 3 pages, Cumming, IA 50061.

WWW.REDI-CHLOR.COM/EMERGENCY_OXYGEN.HTM, System O2 Emergency Oxygen Kit, Jun. 3, 2002, 2 pages, Cumming, IA 50061.

U.S. Appl. No. 60/477,452, filed Jun. 9, 2003, "Weak Seal Oxygen Generation Flexible IV System", Anthony J. Senn, et al.

U.S. Appl. No. 60/564,539, filed Apr. 21, 2004, "Instant Chemical Based Flexible Oxygen in a Non-Pressurized Flexbile or Rigid Containment System", Bert K. Moore, et al.

U.S. Appl. No. 60/558,809, filed Apr. 1, 2004, "Oxygen Generation Unit", Steven Hatten, et al.

* cited by examiner

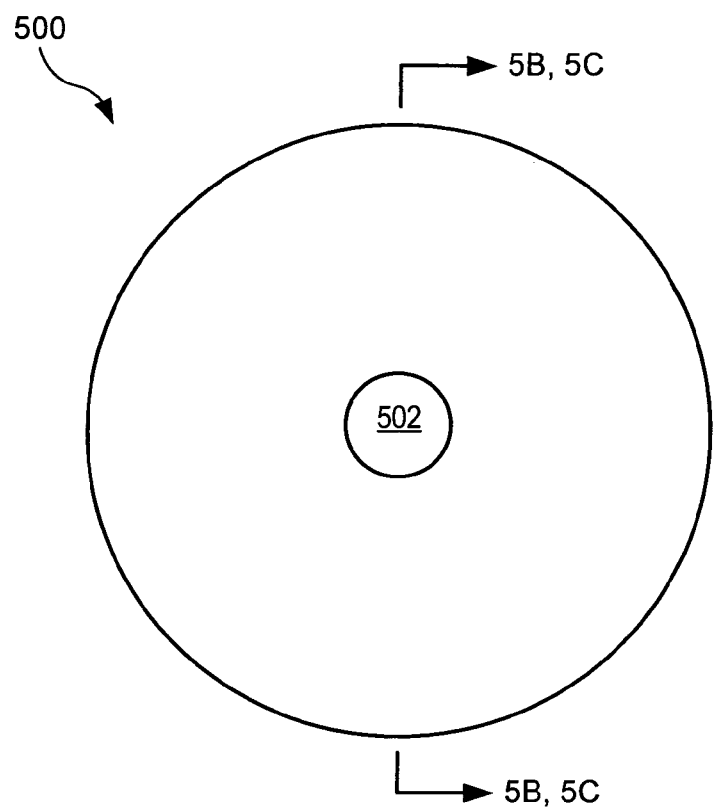
FIG. 5A
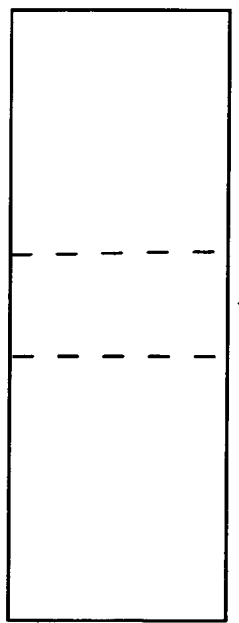 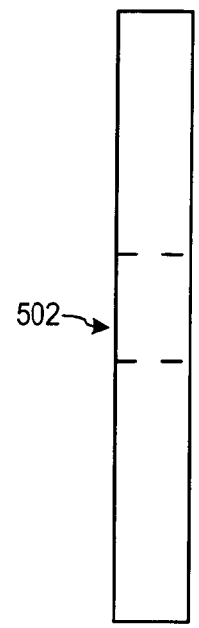
FIG. 5B          FIG. 5C

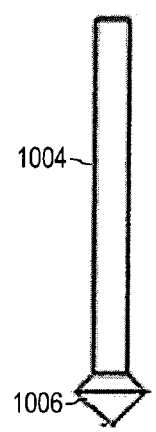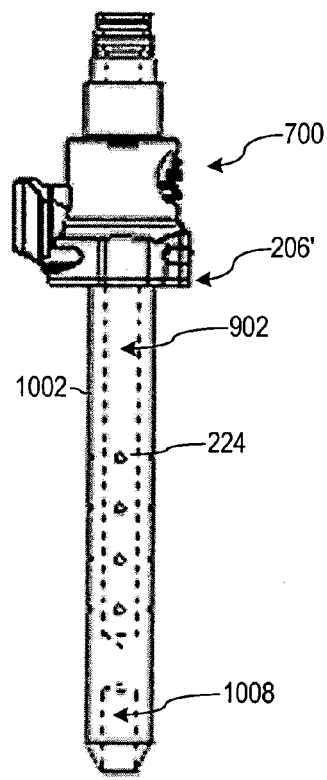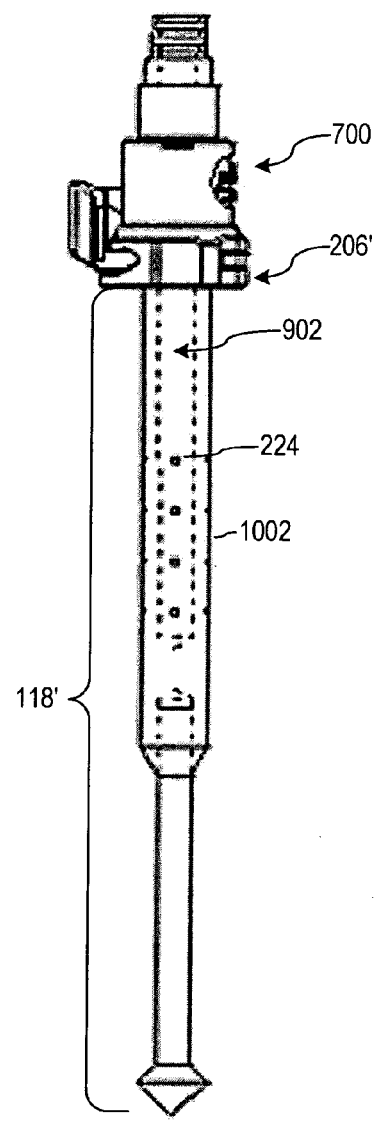
*FIG. 10A*  *FIG. 10B*
*FIG. 10C*

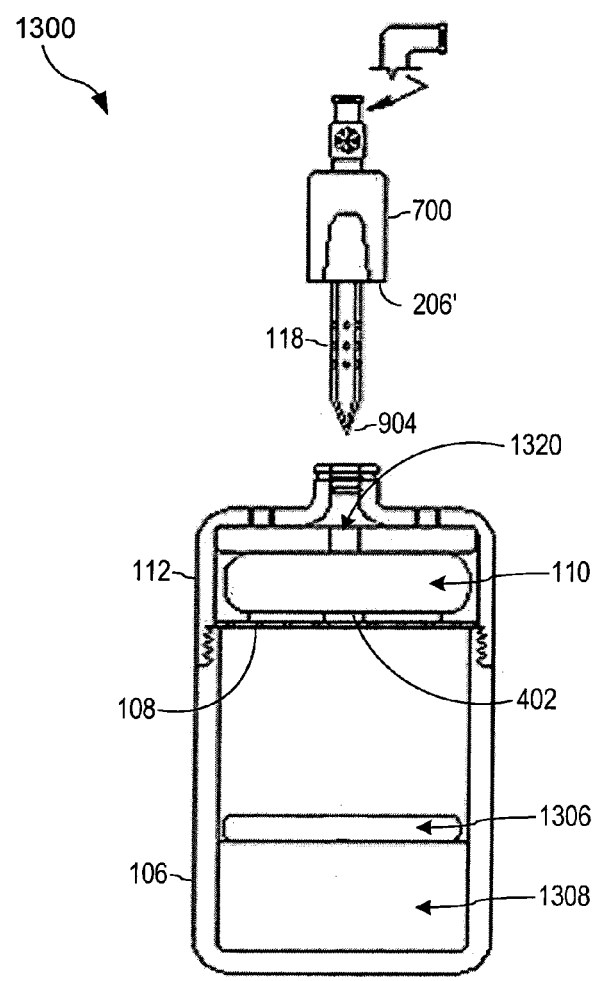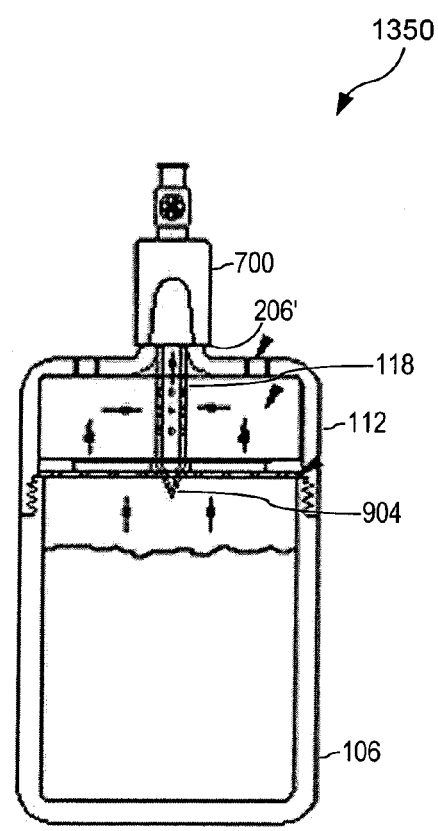
*FIG. 13A*  *FIG. 13B*

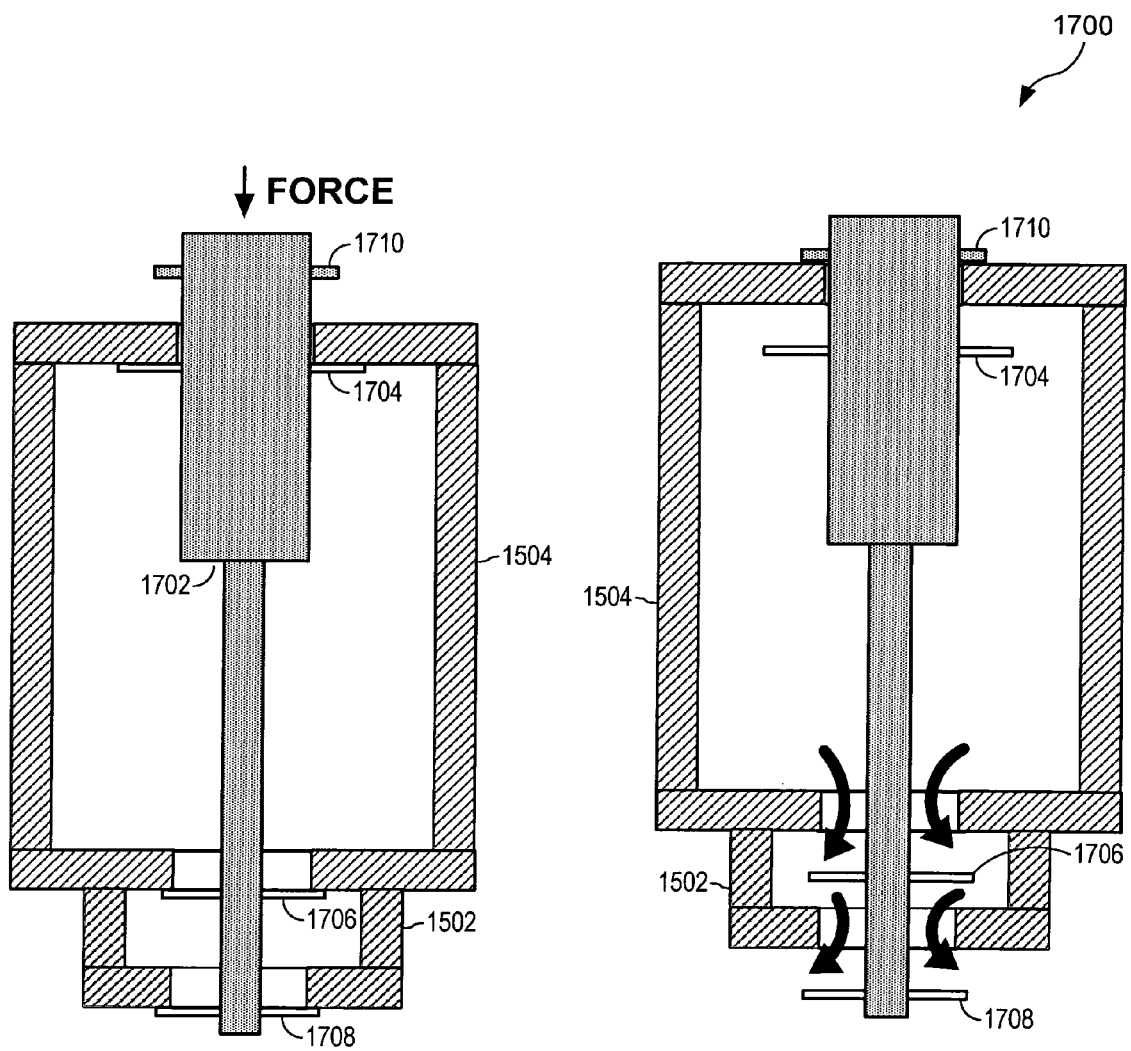
*FIG. 17A*  *FIG. 17B*

METHOD FOR CONTROLLED PRODUCTION OF A GAS

CROSS-REFERENCED APPLICATIONS

This application is a continuation of U.S. patent application Ser. No. 11/045,805 entitled "METHOD AND APPARATUS FOR CONTROLLED PRODUCTION OF A GAS" filed Jan. 28, 2005 now abandoned, which relates to and claims priority from U.S. patent application Ser. No. 10/718,131 entitled "METHOD AND APPARATUS FOR GENERATING OXYGEN", filed Nov. 20, 2003, and U.S. patent application Ser. No. 10/856,591, entitled "APPARATUS AND DELIVERY OF MEDICALLY PURE OXYGEN", filed May 28, 2004, the contents of each of which are hereby incorporated by reference for all purposes.

FIELD OF THE INVENTION

The present invention relates generally to a gas delivery system and, more particularly, to a system that provides an activation method and apparatus as well as a method and apparatus for improving and controlling the gas yield, flow rates and gas production duration.

DESCRIPTION OF THE RELATED ART

Oxygen and other gas generators using chemical reactions have been known for some time. However, none of the conventional devices relating to chemical gas generators have resulted in variable control of the gas generation, while providing higher outputs of gas volume and flow rate, and simultaneously maintaining or improving control of pressure, temperature, and so forth. Gas volume and flow rate are particularly important in emergency oxygen markets. For example, institutions such as the Food & Drug Administration, the American Heart Association and the American Medical Association have required or recommended, as the case may be, a delivery of 90 liters over a 15 minute period, or alternatively an average or minimum flow rate of 6 liters per minute over a 15 minute period. Some attempts to control the flow rate of oxygen have included a catalyst with a gum Arabic solution. The resultant reaction reaches a flow rate of 2 liters per minute after 30 minutes. Other devices create a tablet out of an oxygen generating agent, which similarly produces a low reaction onset (the flow rate at which the reaction commences) and low flow rates over the reaction period. These prior attempted solutions may not be suitable for emergency applications, usually medical in nature or situations where life-threatening factors are present where high flow rates of at least 2 liters per minute to 6 liters per minute or higher are required almost instantly.

In addition, conventional generators have had limited adoption in commerce and in industry. There are several possible factors contributing to this lack of adoption. These factors may include one or a combination of unfavorable characteristics relating to reusability, safety, ease of use/operation, speed of use, heat management, cost, weight, aesthetic design, environmental impact, manufacturability, portability, medical efficacy, effectiveness, flow rate, gas yield, reaction stability, and purity of the gas. Some or all of these characteristics are not addressed, or are inadequately addressed, by the designs in the prior art.

Designs in the prior art have not adequately addressed flow rate and total gas yield. Depending on the situation, such as for oxygen production in emergency situations, high flow rates may be required. For example, the United States Food and Drug Administration (FDA) has long required a flow rate performance for oxygen generators of at least 6 liters per minute over 15 minutes in order to obtain market clearance for over the counter purchase, resulting in at least a total oxygen yield requirement of 90 liters.

High pressures generated inside the reaction chamber generally accompany higher flow rate outputs or requirements. High pressure, such as can be created by confined gases can be particularly dangerous.

Therefore, a need exists for a method and/or apparatus for activating gas production and controlling gas production from a chemical reaction that addresses at least some of the problems associated with conventional methods and apparatus for producing gases, and more specifically medically pure oxygen.

SUMMARY OF THE INVENTION

The present invention provides an apparatus for generating gas from a plurality of separated chemicals. In one embodiment, a plurality of reaction chambers operate cooperatively when the separated chemicals are combined to generate the gas. The flow rate and the total yield can then be varied based on the proportion of separated chemicals in each reaction chamber.

BRIEF DESCRIPTION OF THE DRAWINGS

For a more complete understanding of the present invention and the advantages thereof, reference is now made to the following descriptions taken in conjunction with the accompanying drawings, in which:

FIG. 5A depicts a plan view of a foam breaker, taken along the lines 5B, 5C;

FIG. 5B depicts a cross sectional view of the foam breaker of FIG. 5A;

FIG. 5C depicts a cross sectional view of the foam breaker of FIGS. 5A and 5B when compressed;

FIG. 10A depicts a side cross sectional view of a spiked plunger;

FIG. 10B depicts a side cross sectional view of a spiked plunger in its female connector housing, with the spiked plunger disconnected;

FIG. 10C depicts a side cross sectional view of a spiked plunger in its female connector housing, with the spiked plunger connected to it;

FIG. 13A depicts a side cross sectional view of an activation system for one reaction chamber of the gas activation, production, dispensing and control vessel depicted in FIGS. 1 and 2, having a spike, with the spike withdrawn for clarity;

FIG. 13B depicts a side cross sectional view of an activation system for one reaction chamber of the gas activation, production, dispensing and control vessel depicted in FIGS. 1 and 2, having a spike inserted into the container holding the water to rupture it and allow mixing the the other chemicals to create a flow of gas, with the flow of gas produced indicated by arrows;

FIG. 17A depicts a side cross sectional view of another embodiment of an activation system for one reaction chamber, having a fixed activation member, in the primed position;

FIG. 17B depicts a side cross sectional view of the embodiment of an activation system for one reaction chamber depicted in FIG. 17A, after activation, the arrows indicating flow of the water and catalyst;

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

Figure 1:
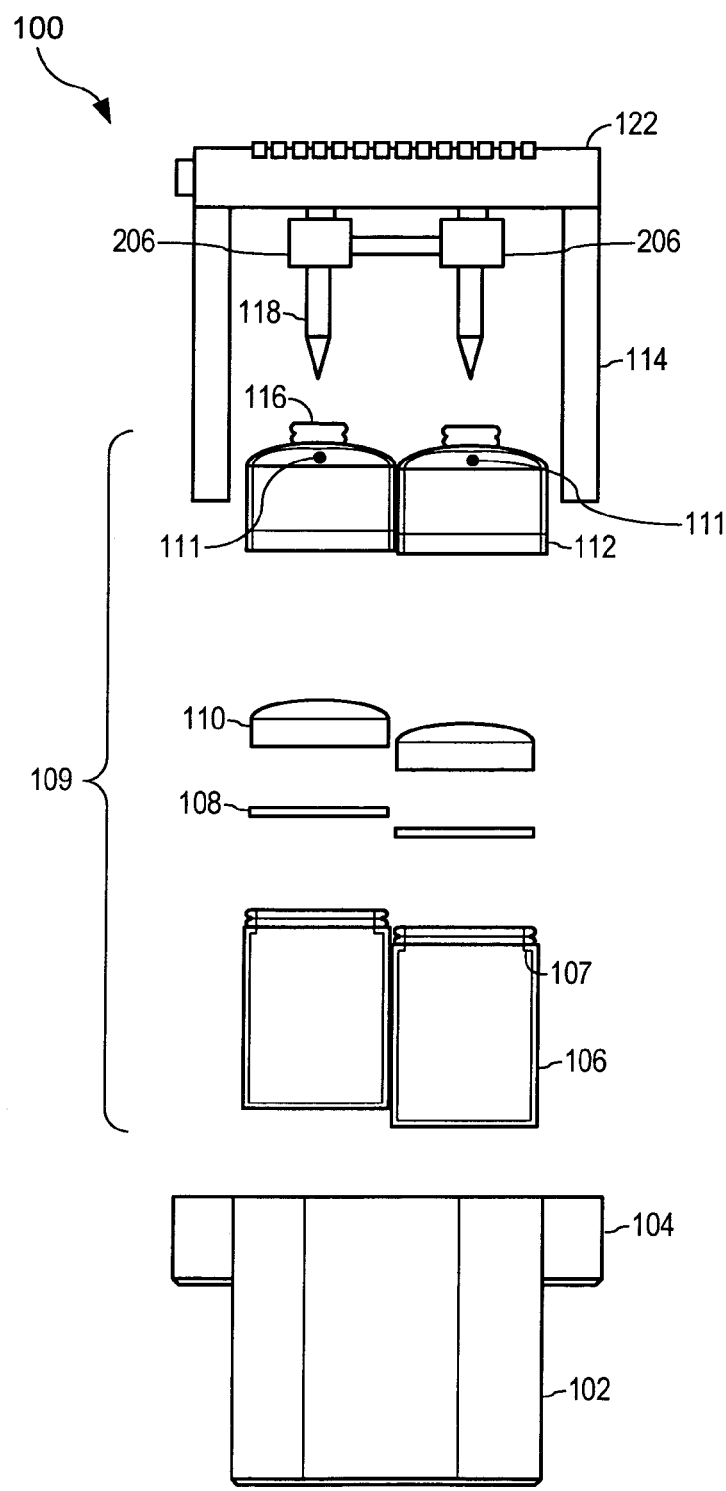
FIG. 1 is a diagram, partly in section, depicting an exploded side view of gas activation, production, dispensing and control vessel in accordance with an embodiment of the present invention.

Referring to FIG. 1 of the drawings, the reference numeral 100 generally designates an exploded view of a gas activation, production, dispensing and control assembly using a manual reaction activation method in accordance with an embodiment of the present invention. The assembly 100 comprises support housing 102, removable reaction chambers 106, screens 108, filters 110, lids 112, and a handle 122.

The main body of the assembly 100 is the support housing 102. There are a number of configurations that can be employed, but a convenient design is a vessel having vertically extending side walls and a bottom surface connecting the side walls. The support housing 102 also has an opening in the top where other members can be inserted. The support housing 102 can also be a smooth, continuous surface or it can be several joined, flat surfaces. For example, the support housing has a compartment for each reaction chamber and can have curved surfaces such that it curves around the reaction chambers 106 in approximately the shape of a figure eight, as viewed from above. In such a configuration the gas activation, production, dispensing and control assembly 100 can be conveniently worn on the hip, by clip-on or otherwise of say, a miner, construction worker or emergency service personnel. Additionally, the support housing 102 can employ two guides 104 that protrude outwardly from the side walls of the support housing 102 to interface with and/or slidably receive the guided members 114 of the handle 122. In the manual activation device shown in FIG. 1, the two guide members 104 allow the user to activate the chemical reaction producing the oxygen or other gas, by pushing the handle 122 in a direction toward the housing 102. The two guide members 104 allow for this to be a smooth and easy process. Upon completion of the chemical reaction, the two guide members 104 similarly allow for a smooth and easy disengagement of the handle 122 in a direction away from the housing 102 utilizing a quick release mechanism 720 (depicted in FIG. 7, but not shown in FIG. 1). The support housing 102 can also act as an additional insulating material to act as a heat shield for any excess heat being generated in the reaction chambers.

Figure 3:
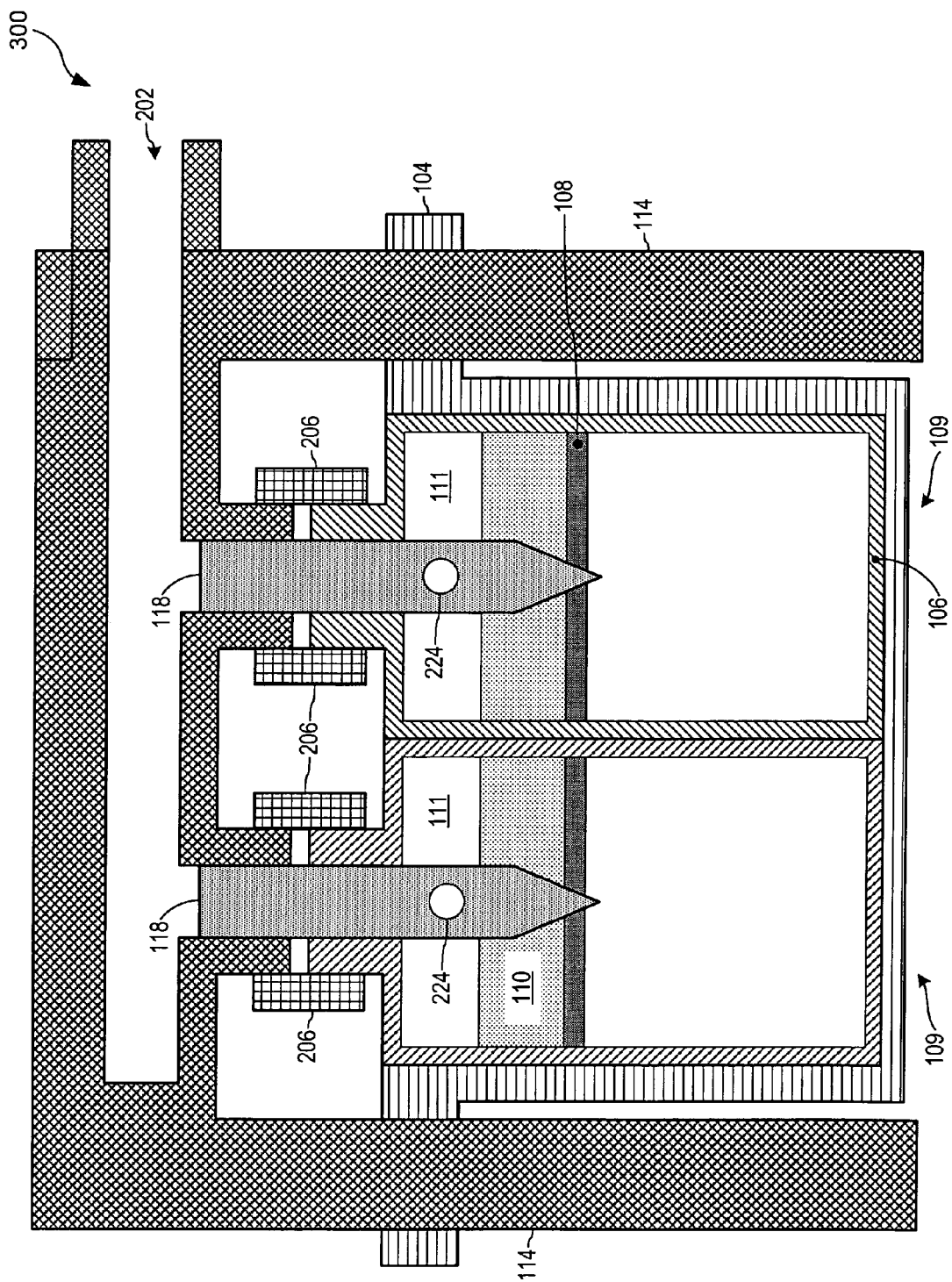
FIG. 3 is a schematic sectional view of the gas activation, production, dispensing and control vessel, in use, with the spiked plungers inserted.

Each of the reaction chambers 106 can be placed within the support housing 102 such that access can be gained to each reaction chamber 106. The reaction chambers 106 can be made of a durable thermoplastic with high tensile strength, high resistance to chemical reactions and high resistance to heat. For example, the reaction chambers 106 can be made of polycarbonate or polytetrafluoroethylene. The lids 112 can be attached to the reaction chambers 106. For example, reaction chambers 106 can have internal female threads and the lids 112 can have corresponding external male threads. Alternatively, the lids 112 can be attached to the reaction chambers 106 by clip in, lock in or click in designs. Screens 108 and filters 110 can be seated on a flange 107 inside reaction chambers 106, but such is not essential to the design. For example, screens 108 and filters 110 can also simply be maintained in position by mechanical pressure, or glued, as depicted in FIG. 3. The reaction chambers 106 are typically cylindrically shaped, but can be any other shape. The reaction chambers 106, however, can be coupled to the lids 112 prior to insertion into the support housing 102.

Figure 2:
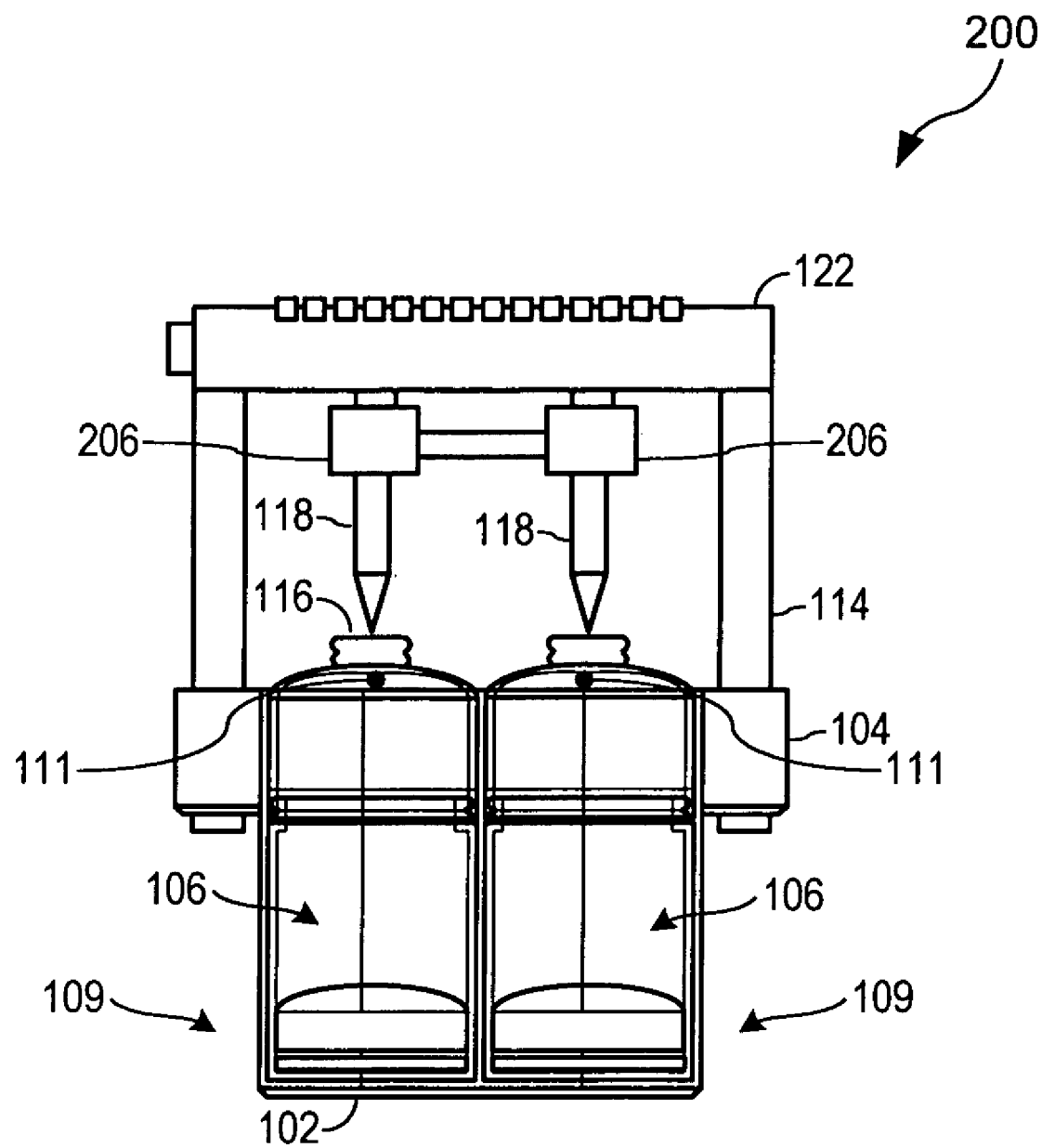
FIG. 2 is a diagram, partly in section, depicting a side view of a primed gas activation, production, dispensing and control vessel.

Referring to FIG. 2 of the drawings, the reference numeral 200 generally designates a primed gas production control vessel.

When the vessel 200 is in the primed position, gas production can be initiated by engaging the handle 122. The guide members 104 (of support housing 102) can contain and guide the arms 114 of the handle 122. By allowing the arms 114 to freely slide within the guides 104 a user would simply place pressure on the handle 122 in a direction toward the support housing 102.

From the primed position, it is evident that alignment can be an advantageous feature. Each of the spiked plungers 118 can be aligned with an opening 116 of a lid 112. Therefore, when engaged, each of the spiked plungers 118 can be slidably inserted into each of the reaction chambers 106 to initiate the reaction and carry out the resultant gas.

Referring to FIG. 3 of the drawings, the reference numeral 300 generally designates a cut-away of a gas activation, production, dispensing and control vessel in use.

When fully assembled, control of the gas production is achieved through the use of multiple reaction chambers 106. Two reaction chambers are depicted, but there can be more reaction chambers depending on the desired flow rate and yield. One reaction chamber can also be used. Chemical reactions occur in the lower portions 210 of the reaction chambers 106. By varying the proportion, amounts and/or composition of the reactants within the vessel, two different reaction rates (and yields) can be maintained independently in each of the reaction chambers 106. Hence, each reaction chamber 106 can contribute a fractional gas output of the total gas output of the vessel, allowing for a variety of gas yields and flow rates. Moreover, the reactants in each reaction chamber 106 can vary, as well, to achieve a desired gas yield and gas flow rate.

Each of the reaction chambers 106 rests within the support housing 102. Each of two guided members 114 of the handle 122 are inserted through one of two guide members 104. Each of the reaction chambers 106 are then coupled to the handle 122 by mechanical couplers 206. The mechanical couplers 206 can be a variety of mechanical coupler types, such as threaded couplers or couplers employing snapping edges. Thus, the combination of use of the guide members 104 and the couplers 206 allow for a good mechanical connection during use.

Also while in use, spiked plungers 118 can be employed to allow gas transmission from the reaction chambers 106 to the gas transmission channel 202 of the handle 122. The spiked plungers 118 can each be coupled to the handle 122 within the gas transmission channel 202 of the handle 122 and can each be inserted into a reaction chamber 106. Each spiked plunger 118 can contact both the filter 110 and the screen 108. The screens 108 can be located at positions adjacent to the lower portions 210, which allow gas to pass and provide mechanical support for the filters 110. Because of the mechanical constraints of the mechanical couplers 206 and the guide members 104, the spiked plungers 118 can each maintain mechanical contact between the filter 110 and the screen 108. Gas produced within the lower portions of the reaction chamber 106 can then pass around the tip of the plunger 118, through the screens 108, the filters 110, and into transmission openings 224 in spiked plungers 118.

Once closed, each of the reaction chambers 106 and the lids 112, along with the reaction chambers' contents such as the gas/oxygen generating material, catalyst, water, screen and filter forms a self-contained cartridge 109 that can be disposable. Each self-contained cartridge 109 is therefore easily replaceable if a user requires additional oxygen or gas (as the case may be) upon completion of a use. For example, the gas activation, production, dispensing and control assembly 300 can be designed to produce 15 minutes of oxygen for emergency or short-duration purposes. If the user requires additional oxygen at the end of that 15-minute period, he/she can simply replace one or both the cartridges 109 to have an additional 15 minutes of oxygen availability. Each used cartridge 109 is simply discarded or recycled (if applicable) after use, allowing for simplicity and ease of use. Self-contained cartridges can be attached to each other to form one removable, self-contained cartridge. The lids 112 can each have a cap to close the respective openings 116, after the completion of the reaction. Closing the openings 116 facilitates the prevention of any leakage of the reaction residue and thereby facilitates convenient disposal of the cartridges.

In reference to the self-contained cartridges 109 there are various configurations possible in regards to the relative locations of the gas/oxygen releasing agent, the catalyst and the water, comprising the ingredients used to make the reaction in the current invention work. The gas/oxygen releasing agent, the catalyst and the water remain separated until a reaction is required. The gas/oxygen releasing agent and the catalyst can remain inert and can have an indefinite shelf life if they are kept dry and moisture free. One configuration example is to have the gas/oxygen releasing agent located at the base of the cartridge (in reaction chambers 106), the catalyst located above the gas/oxygen releasing agent, and the water located above the catalyst, such as for example in the plenums 111 of the lids 112. Upon activation, the water is released and can flow in toward the lower portion of the reaction chamber 106, where the gas/oxygen producing agent (not shown) is disposed, carrying the catalyst along with it through a flushing action, to mix with the gas/oxygen releasing agent at the base of the cartridge. We refer to this cartridge configuration as a water releasing cartridge. In this invention we will discuss different designs for water releasing cartridges. A different cartridge configuration, however, is one where the gas/oxygen releasing agent is located above the water and the catalyst. In this cartridge configuration, the gas/oxygen releasing agent and/or the catalyst is/are released to mix with the water in order to activate the reaction. We refer to this cartridge configuration as a chemical releasing cartridge.

In either cartridge configuration, once a chemical reaction is initiated, the resultant gas can carry small airborne droplets of the gas production solution, or can carry small particles from the reactants. These airborne particles can be undesirable to the equipment attached to the gas generator or to the lungs of an individual. Therefore, there is a need to filter these undesirable particles. There are several methods that can be used to filter such undesirable particles. Methods that can be used include selecting appropriate materials to capture the undesirable particles, and to select an appropriate configuration by locating the selected materials in an appropriate location, relative to other components in the invention. Therefore, material selection and placement can be important factors. However, the filter material employed depends on the gas produced, the composition of the solution, and the usage of the gas. In reference to FIG. 1, the filters 110 can be sponge-like materials to capture the undesirable particles, while allowing the gas to flow through at desirable flow rates. Other effective filter materials can be polytetrafluoroethylene or can be Nylon®, which is available from DuPont. In addition to absorbing or filtering out undesirable particles, filters can also be useful in extracting some heat out of the gas being produced, either in their untreated form, or by being treated with various substances.

Figure 4A:
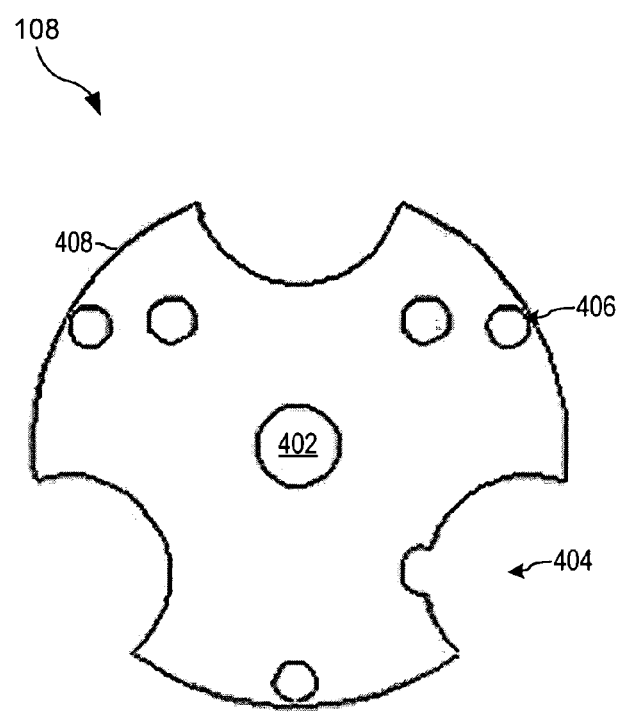
FIG. 4A is a plan view of an example of a screen.
Figure 4B:
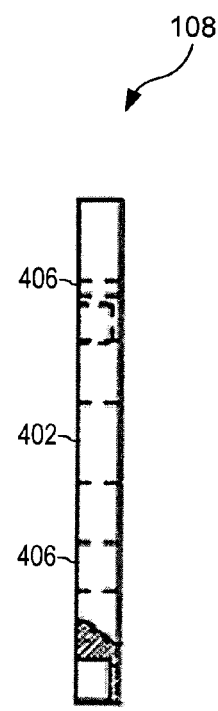
FIG. 4B is a sectional view of the screen depicted in FIG. 4A.

FIG. 4 depicts an example of a screen that can be used. The screens 108 can serve to support the filters 110, while allowing the water to rapidly and evenly disperse into the reaction chambers 106, in order to activate the chemical reaction that produces the oxygen or gas, as the case may be.

In order to allow fluid transfer through the screen 108, several opening can be provided. The edges of the screen 108 would rest against the inner walls of a reaction chamber 106 or on a surface within the reaction chamber 106. Fluids would then be allowed to pass through the openings 404, 402, and 406. Additionally, when engaged, the spiked plungers 118 would at least partially reside within the opening 402.

Referring to FIGS. 5A, 5B, and 5C of the drawings the reference numeral 500 generally designates a foam breaker. FIG. 5A depicts a cross sectional view of the foam breaker 500, where the opening 502 would allow the spiked plunger 118 to reside when engaged. FIG. 5B depicts a side view of the foam breaker 500, and FIG. 5C depicts a side view of the foam breaker 500 when compressed.

Chemical reactions can produce foam, and a foam breaker 500 can counteract this effect. For example, a steel mesh with an appropriate mesh size can be used. Another material that can be used as a foam breaker is a commonly used pot scourer or scrub sponge material, or durable foam material. The foam breaker can be optionally placed within the same fluid transmission path in which both the screens 108 and the filters 110 reside. The screens 108 can also act as foam breakers, and the filters 110 can also act as foam breakers. The screens 108 and filters 110, acting together can also act as foam breakers.

Another method is to apply a defoaming agent or surfactant to the walls and/or the screen and/or the lid and filter. Defoaming agents that can be used include silicone based, polymer based or mineral oil based agents, as well as other surfactants. Regardless of where the foam breaker or defoaming agent is placed in the device, the filter should follow the foam breaker or defoaming agent (as considered in the direction of the gas flow).

Figures 6A, 6B:
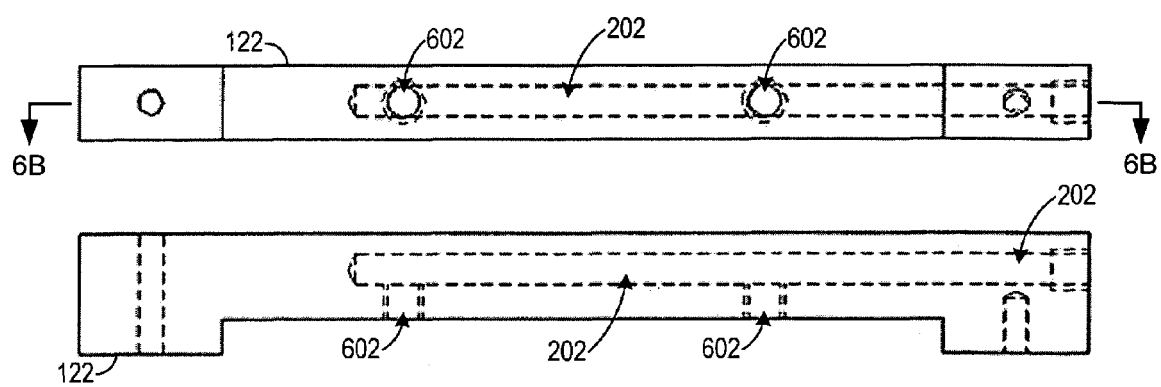
FIG. 6A depicts a plan cross sectional view of a handle useful in connection with the present invention.
FIG. 6B depicts a side cross sectional view of a handle useful in connection with the present invention, taken along the line 6B.

Referring to FIG. 6 of the drawings, the reference numeral 122 generally designates the handle. The handle 122 effectively operates as a manifold. Especially in situations where multiple reaction chambers are used, it is desirable to have a manifold or similar method of combining the gas flow from each individual reaction chamber 106. The manifold gas transmission channel 202 performs the function of combining gases, and the gas flows from each reaction chamber 106 into the ports 602. The gases are then combined in the manifold gas transmission channel 202.

Upon activation, however, the spiked plungers 118 should provide a continuous gas transmission to the manifold gas transmission channel 202. The mechanical coupler 206 can secure lids 112 in such a manner as to seal off the opening 116 of the lids 112 and maintain the connection between the spiked plunger 118 and the handle 122. Specifically, the mechanical coupler 206 can be a simple coupler 206 to which the nozzle 116 of the self-contained cartridge 109 is inserted, as depicted in FIG. 3

Figure 7:
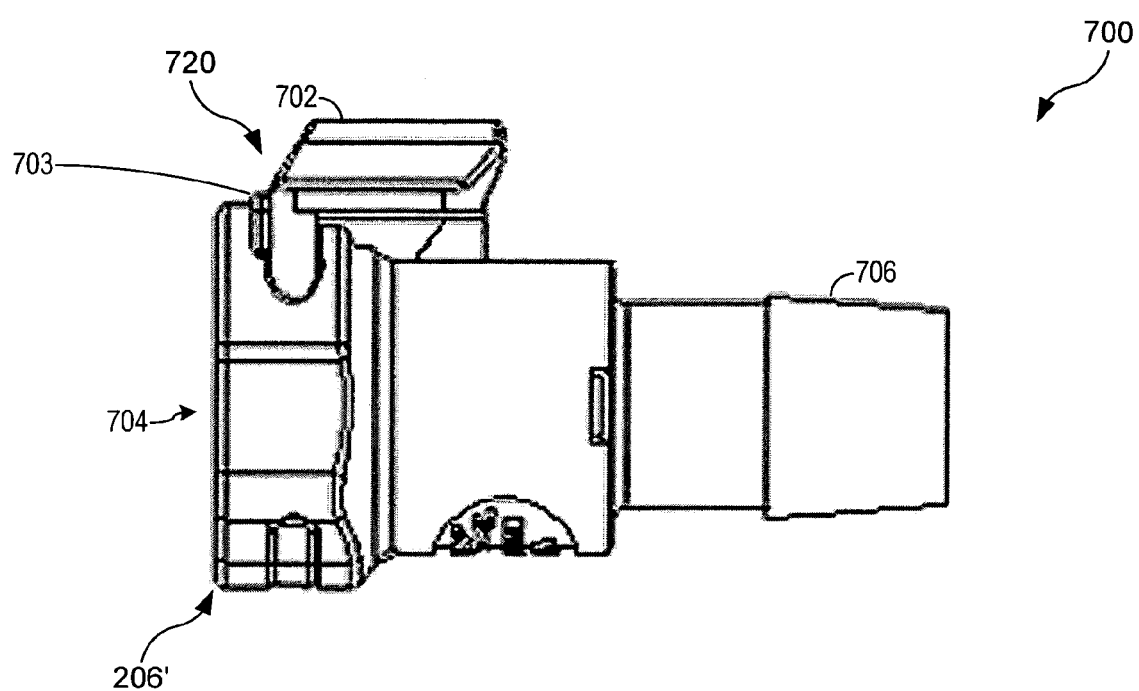
FIG. 7 of the drawings is a partially cross sectioned view of a female connector useful in connection with the present invention.
Figure 8:
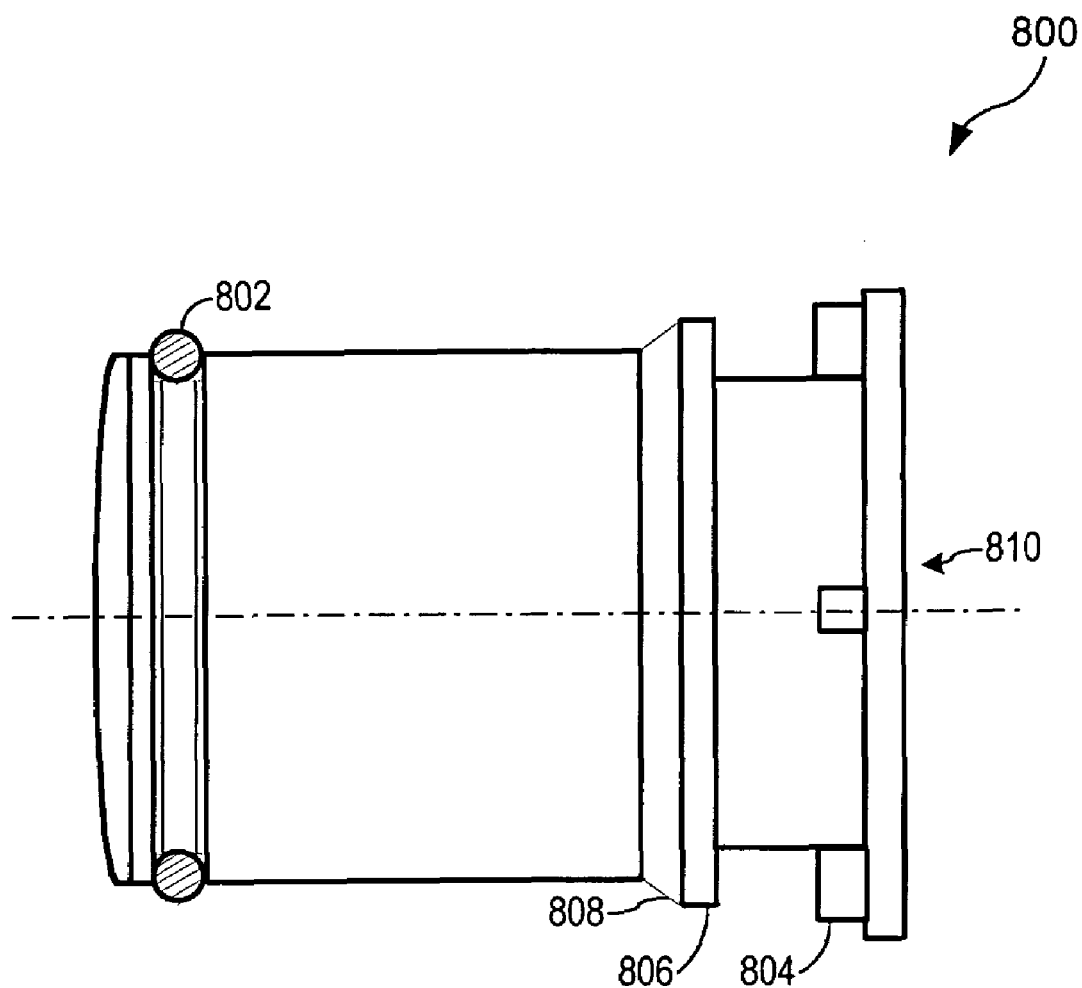
FIG. 8 depicts a cross sectional view of a male connector adapted to fit with the female connector depicted in FIG. 7.

In another embodiment, the couple 206 or can comprise a cooperatively designed male connector adapted to fit over the nozzle 116, as depicted in FIG. 8, and a female connector adapted to fit into the male connection, as depicted in FIGS. 7, 9, 10B and 10C.

Figure 14:
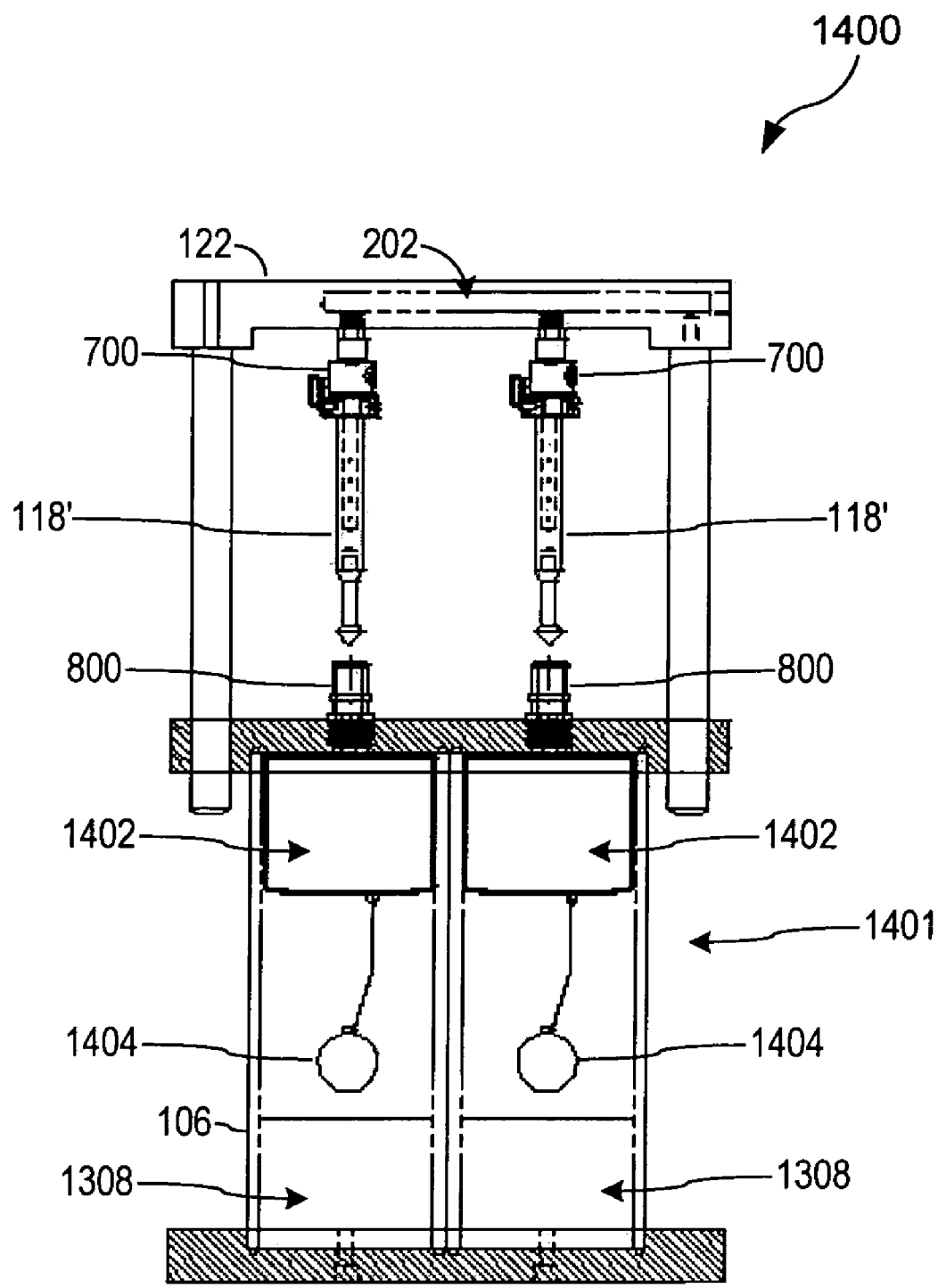
FIG. 14 depicts a side cross sectional view of an activation system with dual reaction chambers having spikes as depicted in FIGS. 10A, 10B and 10C, and having a hanging catalyst bag, with the spike withdrawn and primed for activation.
Figure 15:
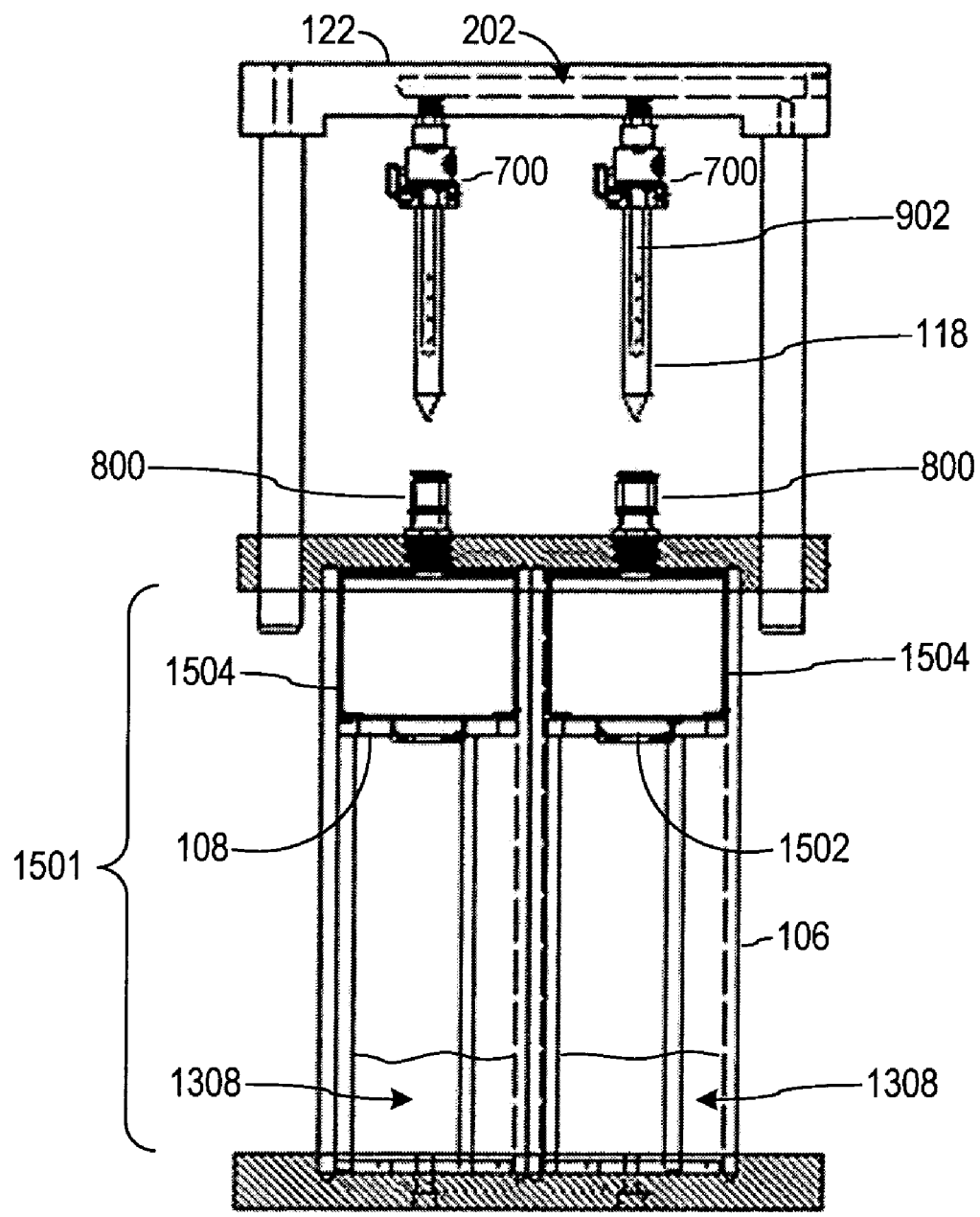
FIG. 15 depicts a side cross sectional view of an another embodiment of an activation system with dual reaction chambers having spikes as depicted in FIG. 9, the male connectors depicted in FIG. 8, and compartments for retaining the catalyst and water as depicted in FIG. 16A with the spike withdrawn and primed for activation.

With initial reference to FIG. 7, e the reference numeral 700 refers to the female connector. The female connector 700 is typically attached to the spiked plunger 118, where the spiked plunger 118 is inserted into the opening 704 of the female connector 700. Additionally, as depicted in FIGS. 14 and 15, the female connector couples to the ports 602 of the handle 122. When engaged, the female connector 700 snaps into place. The female connector 700 comprises an arm 702 that possesses an engagement edge that allows for coupling to a male connector. Additionally, the female connector 700 can be made of various materials, including, without limitation polypropylene, polyethylene, polycarbonate, HDPE, ABS, Acetal, or Polysulfone.

Referring to FIG. 8 of the drawings, the reference numeral depicts a male connector. FIG. 8 is a side view of the male connector 800, with the O-ring seal shown in cross-section for clarity.

The male connector 800 is a cylindrical tube that is able to engage the female connector 700. The male connector can comprise an O-ring 802, an upper edge 804, and a lower edge 806. The O-ring 802 is responsible for providing a gas seal between the male connector 800 to the female connector 700 the the male connector 800 is inserted into the female connector during use. The O-ring can be made of various materials, including, without limitation, silicone or platinum-cured silicone. Platinum-cured silicone can allow for repeated usage of more than one thousand times. The lower edge 806 can engage the edge of the arm 702 by a clicking action. To more conveniently allow for the clicking action to take place, a slanted engaging face 808 is employed. Additionally, the upper edge 804 prevents excessive play by providing a stop for the edge of the arm 702. The male connector can also be made of various materials, including, without limitation polypropylene, polyethylene, polycarbonate, HDPE, ABS, acetal, or polysulfone.

The male connector 800 can then be secured to the lid 112 by using threads. Typically, the lid 112 is coupled to the male connector through the opening 810. Therefore, female threads would be contained on the inner walls of the male connector 800 while the male threads would be contained on the lid 112.

Once the reaction is completed, the female connector 700 and the male connector 800 can be easily and quickly disengaged. The quick release mechanism 720 can be coupled to the arm 702 of the female coupler 700. By pressing the quick release mechanism 720 in the direction toward the plane created by the azimuthal axes of the spiked plungers 118, the male connector and the female connector can be disengaged. Additionally, the quick release mechanism 720 can be configured to disengage the female connectors 700 from the male connectors 800 by simply gripping the quick release lever 128 in a direction toward the handle 122.

For applications such as emergency applications it is desirable to have an efficient and easy activation method, which is simultaneously manufacturable and economical. For such emergency applications, the activation method should be such as to commence the chemical reaction instantaneously or near instantaneously with typically one easy step. For example, activation can be achieved by a single push-down action that applies pressure to the handle 122. A system can also be electronic or a sensor, such as for example a system used to detect decompression in aircraft, thereby triggering the deployment of emergency oxygen in the aircraft cabin.

Figure 9:
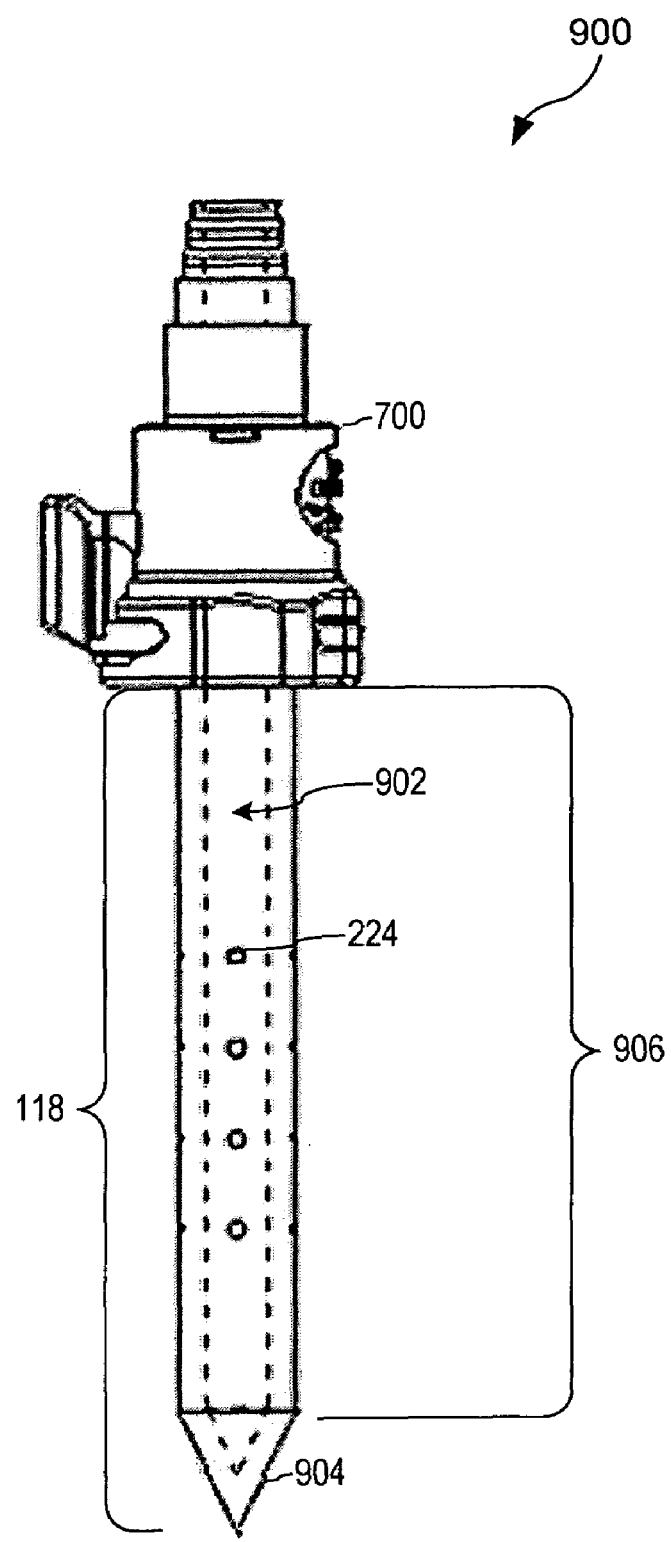
FIG. 9 depicts a side view, partly in cross section, of of one embodiment of the connectable spiked plunger, as connected to the female connector depicted in FIG. 7.

In one embodiment, during activation of the chemical reaction, the spiked plungers 118' are each inserted into lids 112. The spiked plunger 118 and 118' are typically hollow cylindrically-shaped members that have a tip that is suitable for and utilized to puncture a material. Referring to FIG. 9 of the drawings, the reference numeral 900 generally designates one embodiment of the connectable spiked plunger.

Specifically, the connectable spiked plunger 900 comprises a female connector 700 and a spiked plunger 118. The spiked plunger 118 can comprise a cylindrically-shaped shaft 906 with a spiked end 904. Within the spiked plunger 118 is a gas transmission channel 902 along the azimuthal axis of the spiked plunger 118 that allows gas to travel through the plunger 900. Additionally, transmission openings 224 are employed to allow the gas transmission channel 902 to be in fluid contact with gas outside of the spiked plunger 118.

In particular the plunger 900 is designed to puncture a material container or containment bag to initiate a chemical reaction. For example, the spiked plunger 118 can puncture a container or bag that contains water, or the spiked plunger 118 can be used to puncture a membrane or other material, causing the release of water or chemicals, as the case may be. The spiked plungers 118 can be made of durable thermoplastic with high tensile strength, high resistance to chemical reactions and high resistance to heat. For example, the spiked plungers 118 can be made of polycarbonate.

In another embodiment, an extended spiked plunger can be employed. Referring to FIGS. 10A, 10B, and 10C, the reference numeral 1000 generally designates an extended spiked plunger 118'.

Specifically, the plunger 118' can comprise a female connector 700 and a spiked plunger 118'. However, the spiked plunger 118' is different in that it is extended. The spiked plunger 118 comprises a torso 1002 and an extension shaft 1004 with a sharp tip 1006. The torso 1002 can be cylindrically shaped and employ a gas transmission channel 902 along the azimuthal axis of the torso 1002 that allows gas to travel through the plunger 118'. Additionally, transmission openings 224 can be employed to allow the gas transmission channel 902 to be in fluid contact with gas outside of the spiked plunger 118'.

Attached at the end of the torso 1002 is the extension shaft 1004. The extension shaft 1004 can be cylindrically-shaped with one end inserted into the female receptive aperture 1008 at the end of the torso 1002. The sharp tip 1006 can then be attached to the other end of the extension shaft 1004.

In particular, the plunger 1000 is designed to puncture a material containment container or bag to initiate a chemical reaction. For example, the spiked plunger 118 can puncture a container or bag that contains water, or the spiked plunger 118 can be used to puncture a membrane or other material, causing the release of water or chemicals, as the case may be. The spiked plungers 118 can be made of durable thermoplastic with high tensile strength, high resistance to chemical reactions and high resistance to heat. For example, the spiked plungers 118 can be made of polycarbonate.

Figure 11:
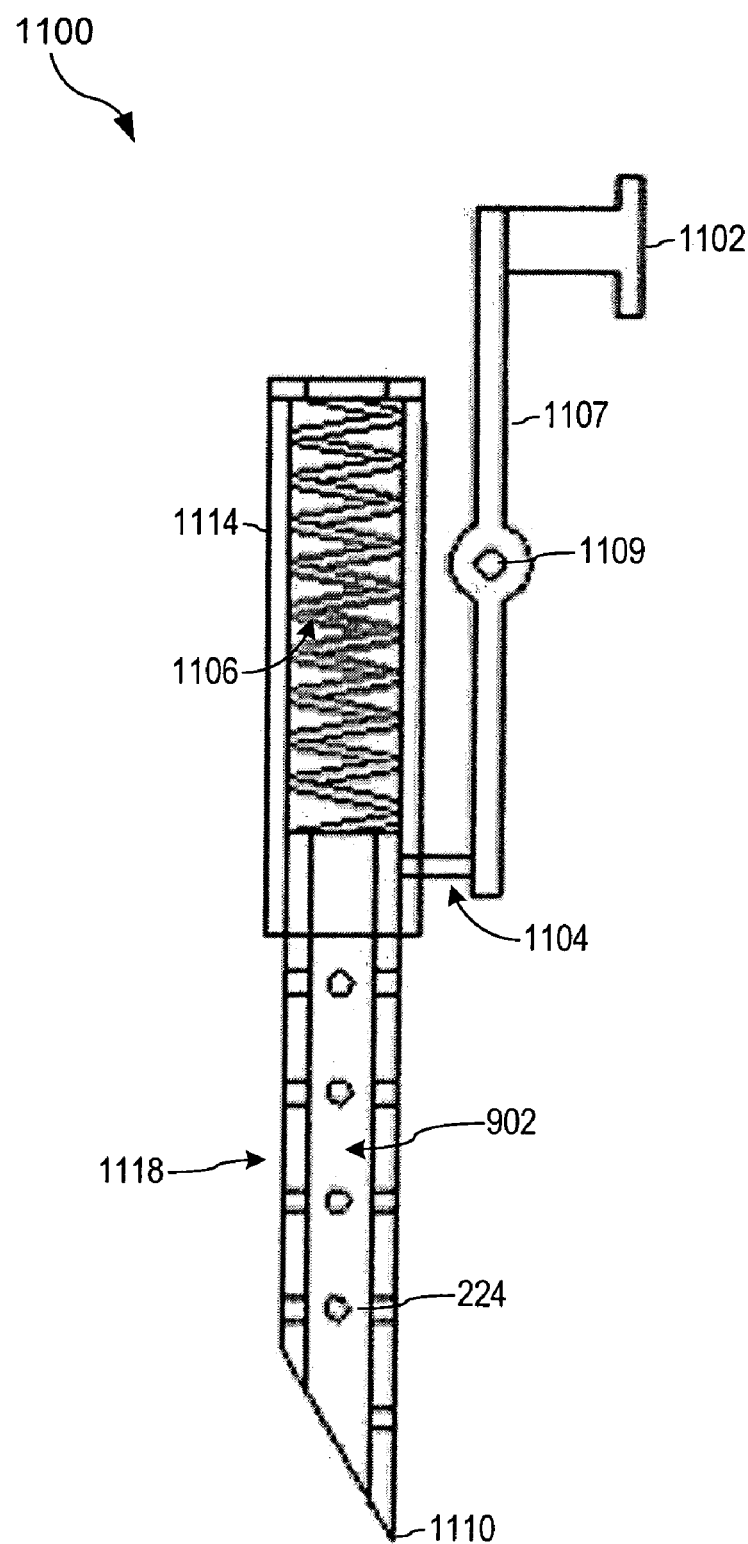
FIG. 11 depicts a side cross sectional view of a spring loaded spiked plunger and release mechanism.

In yet another embodiment, an initiator can be employed as a push-button, lever or pin. An initiation system can also be electronic or a sensor, such as for example a system used to detect decompression in aircraft, thereby triggering the deployment of emergency oxygen in the aircraft cabin. Referring to FIG. 11 of the drawings, the reference numeral 1100 depicts a spring loaded spiked plunger 1118.

The spring loaded spiked plunger 1118 then can utilize potential energy stored in a spring to extend its sharp tip 1110 into the containers of water and/or chemicals to begin the chemical reaction that produces the gas. The spring 1106 can be maintained within the spring housing 1114 and held in place by a retainer 1104. The process of initiating the chemical reaction would involve the utilization of an actuator 1102, which is shown as a push-button actuator. The actuator 1102 causes the retainer 1106 a lever arm 1107 to pivot about pivot 1109, pulling out pin 1104 to release the spring 1106. The spring 1106 then exerts a force on the spiked plunger 1118.

The spiked plunger 1118 can comprise a cylindrically shaped shaft with a spiked end 1110. Within the spiked plunger 1118 is a gas transmission channel 902 along the azimuthal axis of the spiked plunger 1118 that allows gas to travel through the plunger 1118. Additionally, transmission openings 224 can be employed to allow the gas transmission channel 902 to be in fluid contact with gas outside of the spiked plunger 118.

In particular, the plunger 1118 is designed to puncture a material containment container or bag to initiate a chemical reaction. For example, the spiked plunger 1118 can puncture a container or bag that contains water, or the spiked plunger 1118 can be used to puncture a membrane or other material, causing the release of water or chemicals, as the case may be. The spiked plungers 1118 can be made of durable thermoplastic with high tensile strength, high resistance to chemical reactions and high resistance to heat. For example, the spiked plungers 1118 can be made of polycarbonate.

There are several other types of systems that can be employed to initiate a gas generating chemical reaction. An actuator can utilize the pressure associated with a chemical release cartridge. A pressure supply can also be achieved by supplying air pressure to the activation system. Another type can be a mechanical or electro-mechanical source, such as can be provided by a mechanical or electro-mechanical pump or motor. Yet another type can be a pneumatic source, such as for example a pneumatic pump or motor, or a hydraulic source.

Figure 12:
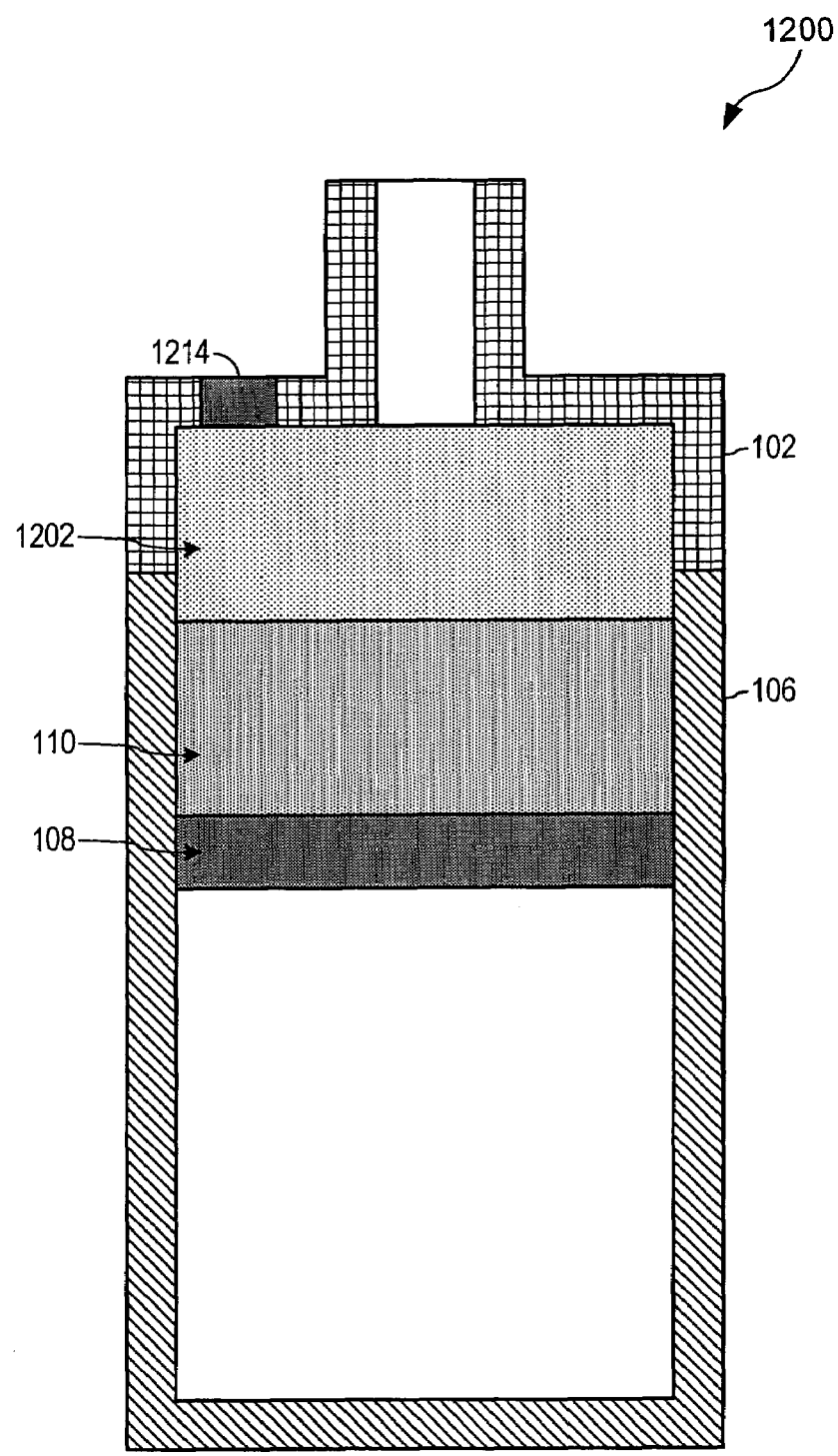
FIG. 12 depicts a side cross sectional view of a cartridge filled with initially separated chemicals and having a pressure relief system.

Depending on the type of gas producing reaction, pressures in the reaction chamber 106 can be high and dangerous. Referring to FIG. 12 of the drawings the reference numeral 1200 generally designates a cartridge with a relief system. The cartridge 1200 comprises a reaction chamber 106, a screen 108, a containment bag 1202, a filter 110, and a lid 112.

When in storage or not in use, the reaction chamber 106 contains "dry" reactants. The "dry" reactants typically include an oxygen rich powder reactant, such as sodium carbonate or sodium percarbonate, as the gas/oxygen generating agent. However, the dry reactants can be liquid reactants that require an additional solvent, such as water, or other "wet" chemical to initiate a gas producing reaction. These "dry" reactants can also contain "dry" catalysts that can assist in reducing heat or increase the reaction rate, such as manganese dioxide. There are also be a number of other catalysts that can be employed for a variety of other purposes. In addition, it should be noted that the water can include an additive to depress the freezing point of the water, but need not do so. Inserted into the reaction chamber 106 is the screen 108. The screen 108 is mechanically supported in a position adjacent to the cavity containing the "dry" reactants. The screen 506 can be mechanically supported in a number of ways, such as by use of threading, snapping edges, and/or taper of the inner walls of the reaction chamber 106.

The screen 108 can provide mechanical support for the remaining components contained within the cartridge 1200.

A containment bag 1202 is positioned adjacent to the screen 108, so that, when pierced, the contents of the bag 1202 can be transmitted through the screen to the "dry" chemicals to begin the reaction. The filter 110 is also supported by the screen 108, so that when gas is produced and transmitted through the screen 506, the gas can be filtered. A variety of filter types can be employed that can be comprised of a variety of materials including, but not limited to, polytetrafluoroethylene.

The final component of the cartridge 1200 is the lid 112. The lid 512 can be coupled to the reaction chamber 106. There are a number of ways to couple the lid 112 to the reaction chamber 106, such as threading and an adhesive.

An additional feature of the cartridge 1200, however, is the presence of a pressure relief valve 1214. In cases where high pressure, volatile gases are produced, such as oxygen or hydrogen, high pressures can be dangerous. Even in situations where gases do not present a fire hazard, such as nitrogen, high pressures can be an undesirable because the high pressure gas can exploit defects or fractures in the cartridge 1200 to cause the cartridge to rupture. To relieve pressure within the cartridge 1200, a relief valve 1214 can be employed to relieve pressure within the chamber at a calibrated level. For example, pressure relief can occur at 300 psig. There are a wide variety of pressure relief systems available, such as pop-off valves and rupture discs that can be adequately calibrated to relieve pressure at a desired level.

There are also alternative arrangements for containing the materials employed to sustain the chemical reaction. Referring to FIGS. 13A and 13B of the drawings, the reference numerals 1300 and 1350 depict an activation system primed for activation and the system in use, respectively.

The system 1300 comprises a cartridge 1301, a spiked plunger 118, and a female connector 700. The cartridge 1301 then comprises a filter 110, water-filled bag 1304, a screen 108, a catalyst filled bag 1306, and a gas releasing agent 1308 contained within a reaction chamber 106 and a lid 112.

The bag housing the catalyst 1306 can be made of any number of materials, but can also be made of a water-soluble material. The bag 1304 housing the water can be made of any number of air impermeable and water/moisture impermeable materials, but can also be made of a laminate material consisting of aluminum, polypropylene and woven mesh.

The cartridge 1301 typically also has an air-impermeable and water-impermeable seal 1302. The air-impermeable and water-impermeable seal 1302 can be made of various materials, including, without limitation materials such as Mylar, polytetrafluoroethylene or Nylon®. The purpose of the seal 1302 is to maintain an hermetic seal so that the cartridge can have an extended or indefinite shelf life.

Upon activation, the spike tip 904 punctures or ruptures the seal 1302, and the spiked plunger 118 enters the filter aperture 1320. At that point, the spike tip 904 punctures or ruptures the water bag 1304, causing the water to flow into the reaction chamber 106. The spiked plunger 1130 completes the piercing of the water bag 1172 and proceeds through the screen aperture 402 such that the spike tip 1142 protrudes just slightly beyond the screen 108. Once the spiked plunger 1130 has penetrated the water bag 1172 and traversed all the way through, spiked plunger and connector assembly 1140 is secured to the cartridge and sealed by the connector 1180.

Once released, the water creates an aqueous environment for the reaction to take place. The water dissolves the bag containing the catalyst 1306. The gas generated as a result of the reaction can then be released from the cartridge 1301 through the spiked plunger 118.

Another embodiment of the cartridge 1301 includes a hanging catalyst bag. Referring to FIG. 14 of the drawings, the reference 1400 generally designates a release system with a hanging catalyst. The system 1400 comprises cartridges 1401, a handle 122, and cutting members such as spiked plungers 118. Within the cartridges 1401, there is an upper assembly 1402, a hanging catalyst 1404, and a gas generating chemical 1308.

Upon activation, the spiked plunger 118 engages the upper assembly 1402. Water then flows into the reaction chamber 106. The water creates an aqueous environment for the reaction to take place, while dissolving or permeating the bag containing the catalyst 1404. The gas generated as a result of the reaction can then be released from the cartridge 1401 through the spiked plunger 118 to the gas transmission channel 202 of the handle 122. The bag housing the catalyst 1404 is suspended slightly above the gas generating material 1308, which facilitates faster dissolution of the bag if the bag is a water-soluble bag, or faster permeation through the bag if the bag is permeable.

Referring to FIG. 15, the reference number 1500 depicts another system primed for activation. The system 1500 is different in that the catalyst is contained in a catalyst dispersal housing 1502, located just below the water containment housing 1504. The water containment housing 1504 can contain a bag with water, or can have water contained inside of it.

The system 1500 can comprise self-contained water releasing cartridge 1501, a spiked plunger 118, and a connector assembly 700 coupled to the handle 122. The cartridge 1501 comprises a gas or oxygen releasing agent 1308, the catalyst dispersal housing 1502, the screen 108, and the water containment housing 1504. If the water is contained in a bag, the bag can be made of any number of impermeable materials, but can also be made of a laminate material consisting of aluminum, polypropylene and woven mesh.

Upon activation, the spiked plunger 118 engages the water containment housing 1504 and the catalyst dispersal housing 1502. Water then flows into the reaction chamber 106. The water creates an aqueous environment for the reaction to take place. The gas generated as a result of the reaction can then be released from the cartridge 1301 through the spiked plunger 118 to the gas transmission channel 202 of the handle 122.

Figure 16A:
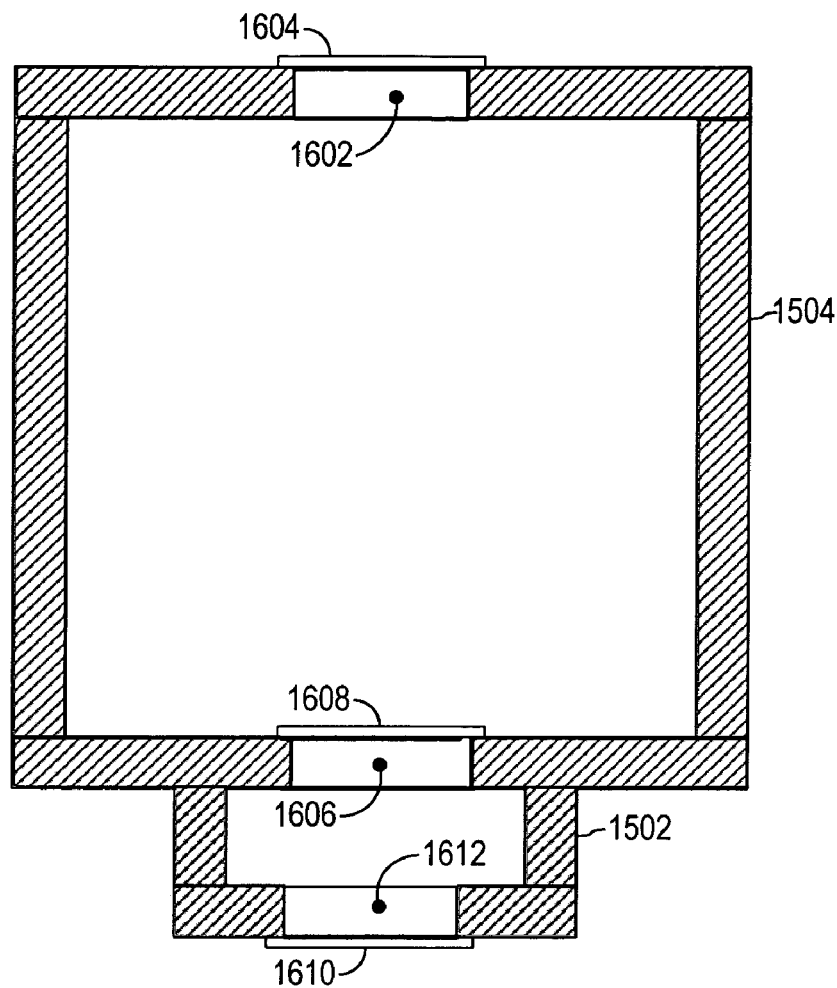
FIG. 16A depicts a cross-sectional side view of the water containment housing and an adjacent catalyst dispersal housing depicted in FIG. 15.

A desirable feature of the system 1500 is the construction of the water containment housing 1504 and the catalyst dispersal housing 1502. Referring to FIG. 16A of the drawings, the reference numerals 1504 and 1502 generally designate the water containment housing and the catalyst dispersal housing, respectively. Specifically, water containment housing 1504 and catalyst dispersal housing 1502 assembly can be made as one piece, and can be made of any material. Without limitation, the water containment housing and catalyst dispersal housing assembly can be made of plastic or thermoplastic, including polypropylene, polyethylene, polycarbonate, HDPE, ABS, acetal, polysulfone, or poly vinyl chloride (PVC).

The water containment housing 1504 and the catalyst dispersal housing are designed such that it can be a self-contained unit. The water containment housing 1504 has an upper aperture 1602 covered by an upper sealing membrane 1604 and has a lower aperture 1606 covered by a lower sealing membrane 1608. A spiked plunger can be inserted through the seals 1604 and 1608 and the apertures 1602 and 1606 upon activation. The catalyst dispersal housing 1502 also has an aperture 1612 covered by a catalyst housing seal 1610, which allows the spiked plunger 118 to finally exit the catalyst dispersal housing 1502 during the activation process.

Prior to activation, the water is sealed into the water containment housing 1504 by upper seal 1604 and lower seal 1608. While the upper seal 1604 and the lower seal 1608 are shown as having been placed on top of each respective adhesion surface, each can be also be placed on the bottom side of each respective adhesion surface. Catalyst housing seal 1610 can also be placed on either side of the adhesion surface. Each of the seals 1604, 1608, and 1610 can be made of air-impermeable and water-impermeable materials, including, without limitation materials such as polytetrafluoroethylene, Mylar®, or Nylon® (both available from DuPont).

Figure 16B:
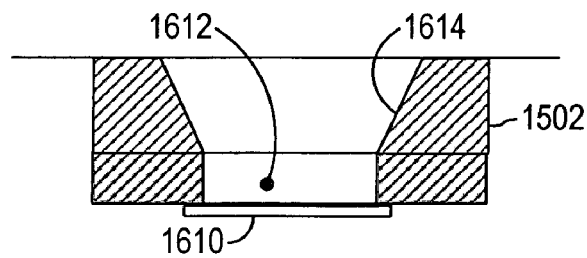
FIG. 16B depicts cross-sectional side view of a modified version of the catalyst dispersal housing depicted in FIG. 16A.

During activation, the water is released from the water containment housing 1504 and proceeds in a direction towards the reaction chamber 106, flushing the catalyst with it. Referring to FIG. 16B, the catalyst dispersal housing 1502 can have an angled or beveled surface 1614, which facilitates faster and more efficient dispersal of the catalyst and/or water. Additionally, the water containment housing 1504 can also have contain an angled or beveled surface in order to facilitate faster and more efficient dispersal of the water upon activation. The angled or beveled surface 1614 can facilitate better flushing of the catalyst, and/or facilitate faster and more efficient dispersal of the catalyst.

The self-contained housings can also include an in-place spike. Referring to FIGS. 17A and 17B of the drawings, the reference numeral 1700 generally designates an alternative design of the self-contained housings. Specifically, a plunger 1702 with an upper seal 1704, a lower seal 1706, and catalyst housing seal 1708 is employed. The seals 1704, 1706, and 1708 are attached to the plunger 1702 such that the seals 1704, 1706, and 708 do not break away from or separate from the plunger 1702 during normal use. The seals 1704, 1706, and 1708 are attached to the water containment housing 1504 and catalyst dispersal housing 1502 such that the seals 1704, 1706, and 1708 are breakable, detachable, or removable upon activation.

FIG. 17A depicts the self-contained housings 1700 in a primed position. Upon activation, the downward force transferred by the pressure source rips, tears, dislodges or otherwise detaches the seals 1704, 1706, and 1708, causing the contents to flow into the reaction chamber 106. Stoppers 1710 allow the plunger 1702 to travel only a specified distance.

Figures 18A, 18B:
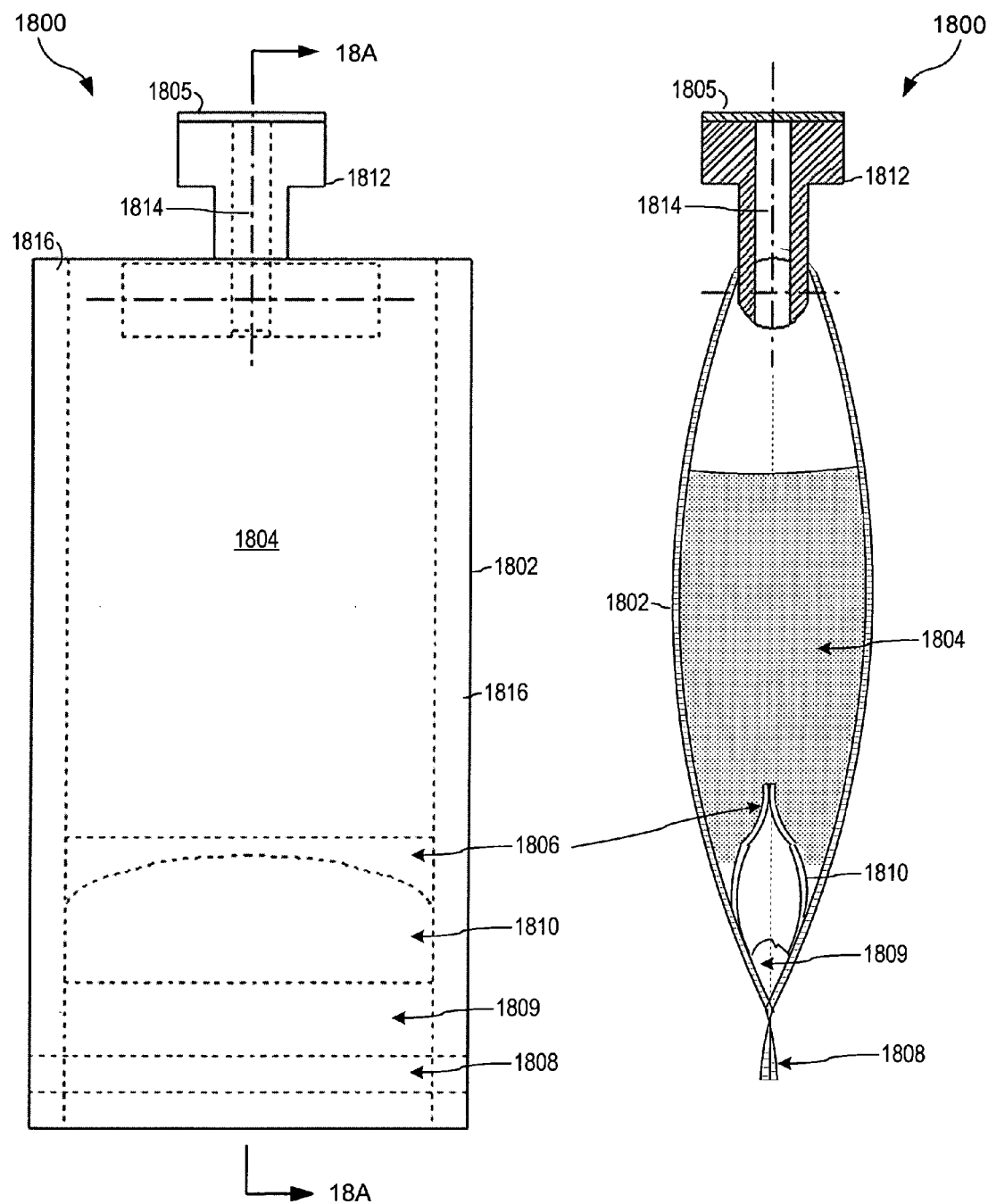
FIG. 18A depicts a front view, partly in phantom, of a powder release pouch cartridge assembly.
FIG. 18B is a sectional side view of the powder release pouch cartridge assembly depicted in FIG. 18A, taken along line 18A-A.

An alternative activation method can involve a chemical release cartridge bag configuration. Referring to FIGS. 18A and 18B, the reference numeral 1800 generally designates a pouch that employs a method for storing the gas/oxygen releasing agent and the catalyst.

Accordingly, there is a planar sealed pouch 1800 formed of air- and water-impermeable sheet material 1802 which is resistant to the basic chemicals commonly used. The sheet material 1802 supports the gas/oxygen releasing agent 1804 and has a web seam 1806 whose apex points upwardly towards the gas/oxygen releasing agent 1804. The sheet material 1802 has a base seam 1808 parallel to and below the web seam 1806. The base seam 1808 then seals the pouch 1800. The region between the web seam 1806 and the base seam 1810 forms a compartment 1810 into which catalyst 1809 is disposed.

The entire contents of the pouch 1800 are designed to be released in a rapid fashion into water contained in an outer container in which the pouch 1800 is contained, such as container 106. Therefore, it is thought that the web material 1810 is to be a non-permeable laminar sheet so that none of the chemical material escapes into the volume below the web material. Additionally, the web seam 1806 is formed with a pressure sensitive seal which is broken when pressure is applied.

The pouch 1800 is constructed using a continuous sheet of water- and air-impermeable sheet material 1802 folded such that the fold, situated in the middle of the sheet, fits over and advantageously accommodates the nozzle element 1812. The water- and air-impermeable sheet material 1802 is welded together at side seams 1816 and bottom seam 1808, and the sheet material 1802 can be a multi-layer laminate such as (from inside to outside) polyester, aluminum foil, polyester and polypropylene. It should be noted that side seams 1816 can also be frangible during use, like seam 1808, but need not be.

During use, water or air is introduced into the pouch cartridge by means of a hollow injector inserted into the delivery channel 1814 through membrane 1805. The pressure causes the web material to evert inside-out to vent by rupturing the pressure-sensitive seal at 1806. Thus, the gas/oxygen releasing agent 1804 is released through an opening made in the web seam 1806. The catalyst is simultaneously released through the web seam 1806. Because of the geometrical shape of area 1810, the rupturing of seal 1806 occurs in a predictable and reproducible manner. Once the gas has been produced, humidification and/or cooling/warming of the gas may be required.

Figure 19:
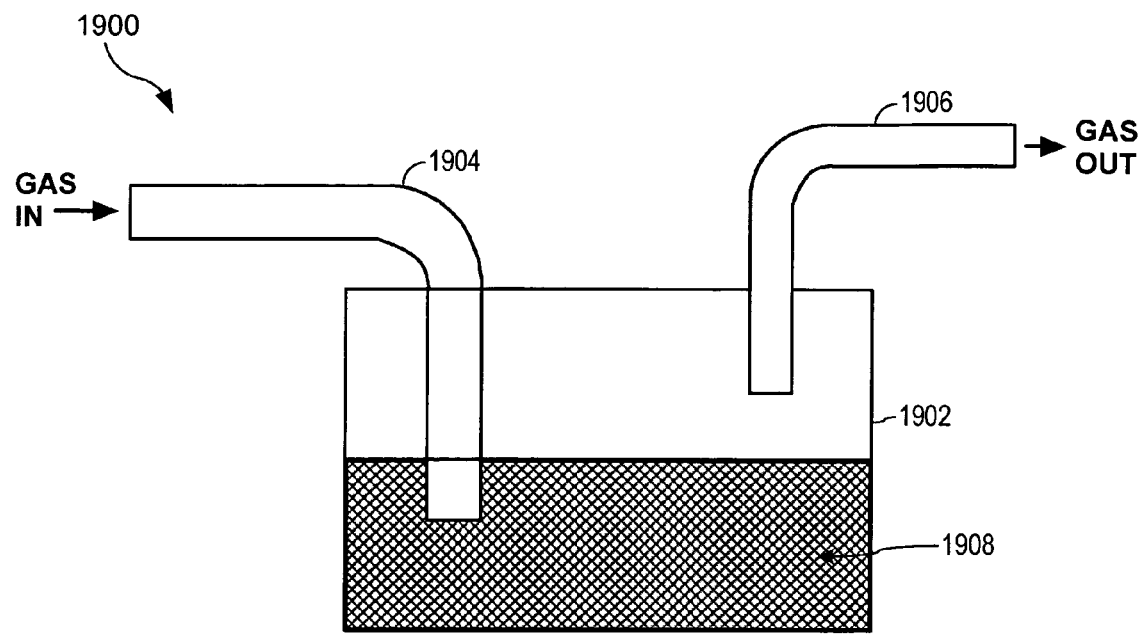
FIG. 19 is a partially diagrammatic side view of a bubbler.

Referring to FIG. 19 of the drawings, the reference numeral 1900 generally designates a bubbler. The bubbler 1900 comprises a liquid holding tank 1902, an intake tube 1904, an exhaust tube 1906, and a liquid 1908.

During the operation, the gas is bubbled through the liquid. Because gas input pressure into the bubbler 1900 is higher than atmospheric pressure, the gas can be forced through the intake tube 1904. Part of the intake tube 1904 is submerged within the fluid 1908, the exhaust gas bubbles through the liquid 1908. The effect of traveling through the liquid 1908 is that the gas will transfer heat to the liquid 1908 (cooling) or receive heat from the liquid 1908 (warming).

Once the gas has bubbled to the surface, the gas can then exit through the exhaust tube 1906. When the gas exists, it is likely that small droplets of the liquid can be carried with the gas. Additionally, vapors of the liquid can also be carried. In the case of oxygen production, the oxygen can be cooled or warmed through water. Once bubbled, the oxygen would carry water vapor, thus, producing humidified oxygen.

Figure 20:
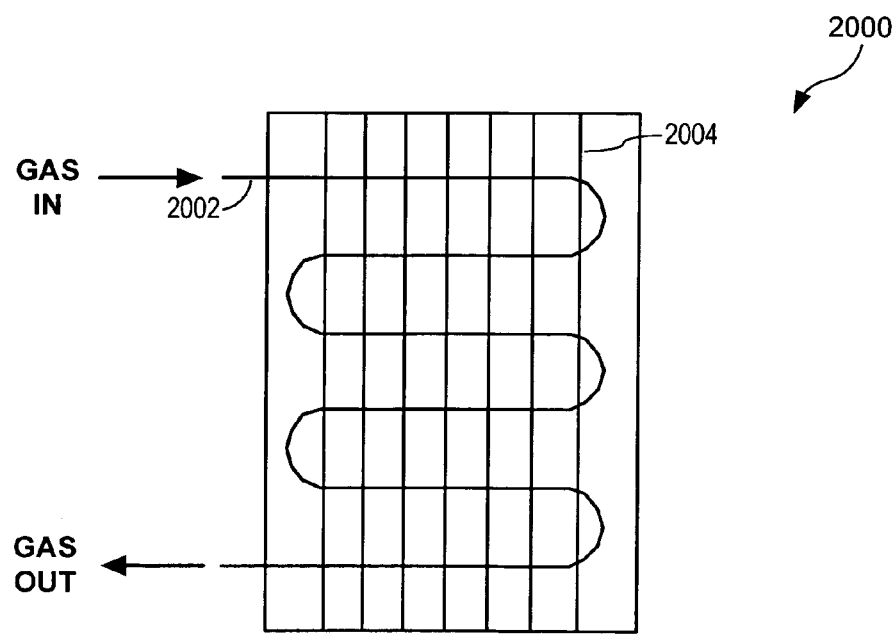
FIG. 20 is a diagram depicting a heat exchanger/radiator.

Another design to cool or warm a gas is by use of a radiator. Referring to FIG. 20 of the drawings, the reference numeral 2000 generally designates a radiator. The radiator comprises fins 2004 and a radiator tube 2002.

As gas is output, a heat sink is employed to transfer heat. The gas is input into the radiator tube 2002 to snake through the radiator 2000. As the gas progresses through the radiator 2000, heat is transferred to the fins 2004. The fins 2004 then transfer heat to a larger heat sink. The larger heat sink can be a variety of heat sinks which includes, but is not limited to, the atmosphere.

One of the features of the above referenced devices is the ability to utilize multiple reactions chambers. Having multiple reaction chambers creates the ability to increase the performance of the gas dispenser, without the associated increase in pressure and temperature if only one reaction chamber is used. For example, a reaction that produces 90 liters of oxygen in 15 minutes can experience an exponential increase in pressure, especially after a certain internal (to the reaction) temperature is reached. By splitting this same reaction into two reactions, completely isolated from each other in separate chambers (say, of each producing 45 liters over 15 minutes), a stable delivery of gas is produced without the exponential increase in pressure and/or temperature that can result from the same 90 liter reaction over 15 minutes contained in one chamber with one reaction.

Similarly, a much higher degree of control is possible over the increase in temperature of the gas by splitting the reaction into multiple reactions. Normally, reactions such as the exothermic reactions that generate oxygen, create heat and a concomitant increase in pressure in a static volume (i.e. there is a direct correlation between temperature and pressure). A further benefit of using multiple reaction chambers is that a higher reaction onset can be achieved.

Specifically, any multiple of reaction chambers can be combined to create any desired output of volume, flow rate and/or delivery time. For example, 3 reaction chambers, each producing 30 liters of oxygen can be combined to produce the same 90 liter reaction, but with lowered pressure inside each reaction chamber and reduced temperature increase of the generated gas, relative to using the same quantity of reactants and catalyst in only one or two chambers, for example.

Variations in both flow rate and yield can also be varied or dictated by the compositions of the contents in the reaction chambers 106. For example, by varying the amount of a limiting reactant in each chamber and/or by varying the amount and/or composition of the catalyst contained in each cartridge, different flow rates and gas yields can be achieved. For example, by varying the amount of the sodium percarbonate in an oxygen generation reaction in each of the chambers, a yield of 90 liters with a flow rate of 6 liters per minute for 15 minutes or a yield of 30 liters and a flow rate of 3 liters per minute for 10 minutes can be achieved.

The flow rates and yields can be varied depending on the desired usage and can be for different situations, such as emergency oxygen for aircraft or mines. While there are many possible or acceptable flow rate profiles applicable to the aviation industry, one example may be to have a reaction that produces approximately 4 liters per minute for 4 minutes and then drops to 1 liter per minute for 8 minutes. Using 2 reaction chambers can achieve this general performance profile.

Figure 21:
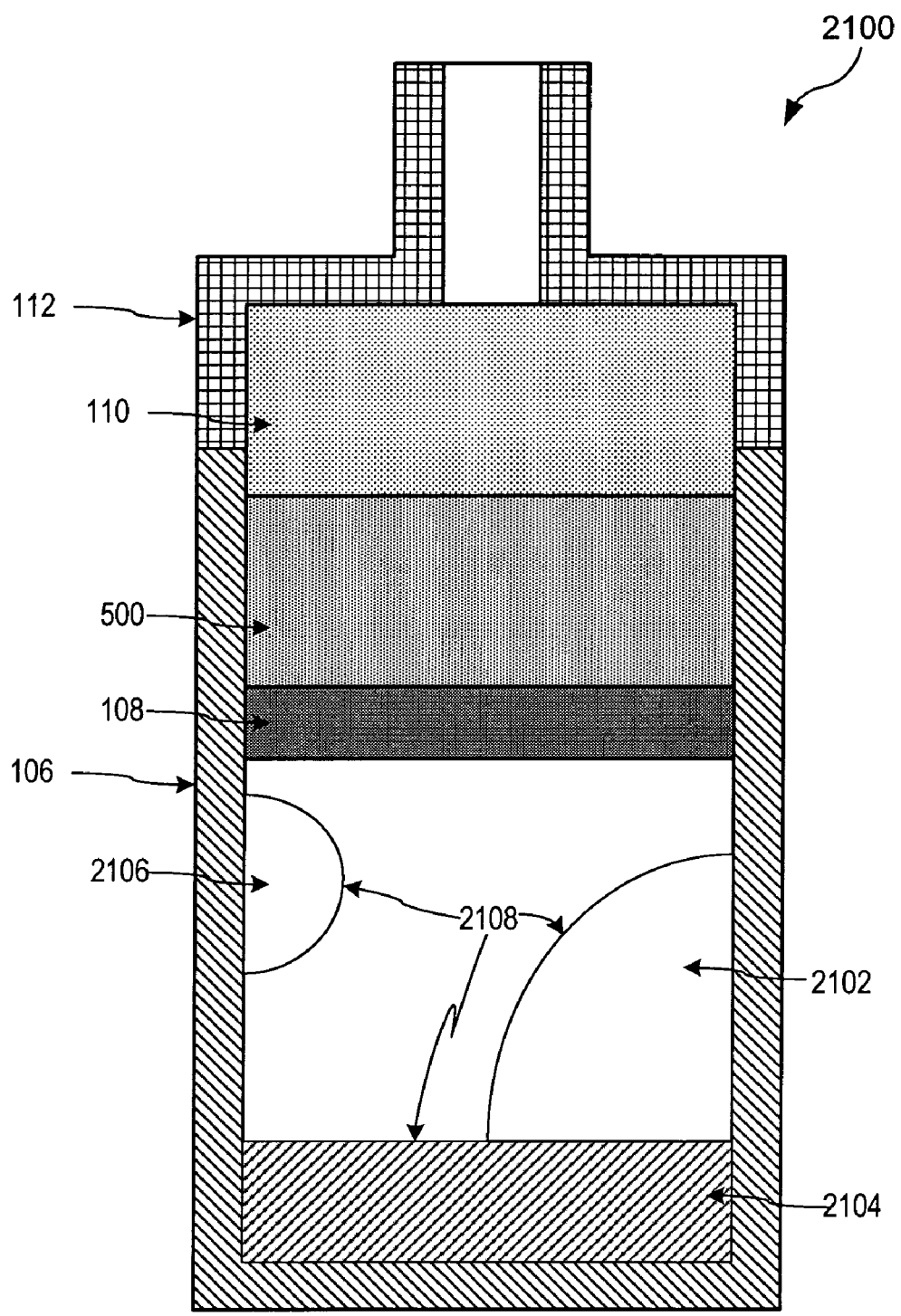
FIG. 21 depicts a side cross sectional view of an embodiment of a cartridge for one reaction chamber, showing different locations for the catalyst and gas/oxygen producing agent.

Additionally, there are several other configurations that can be employed to store the chemicals. Referring to FIG. 21 of the drawings, the reference numeral 2100 generally designates a cartridge 2100. The cartridge 2100 comprises a lid 1126 and a reaction chamber 106.

When combined, the reaction chamber 106 and the lid 112 contain a filter 110, a foam breaker 500, a screen 108, water 2104, a gas producing agent 2102, and a catalyst 2106. The filter 110 and the foam breaker 500 are layered on top of the screen 108, and the chemicals 2106, 2102, and 2104 are contained within the lower portion of the reaction chamber 106. The water 2104 rests at the bottom of the reaction chamber 106, being held in place by frangible seal 2108. The catalyst 2106 and the gas producing agent 2102 are each contained on a side of the reaction chamber, held in place by a frangible seal 108.

Upon activation, the frangible seals 2108 are broken. The chemicals 2102, 2104, and 2106 then mix to create a gas generating reaction. The gas produced traverses the screen 108, the foam breaker 500, and the filter 110 to exit the cartridge 2100.

Figure 22:
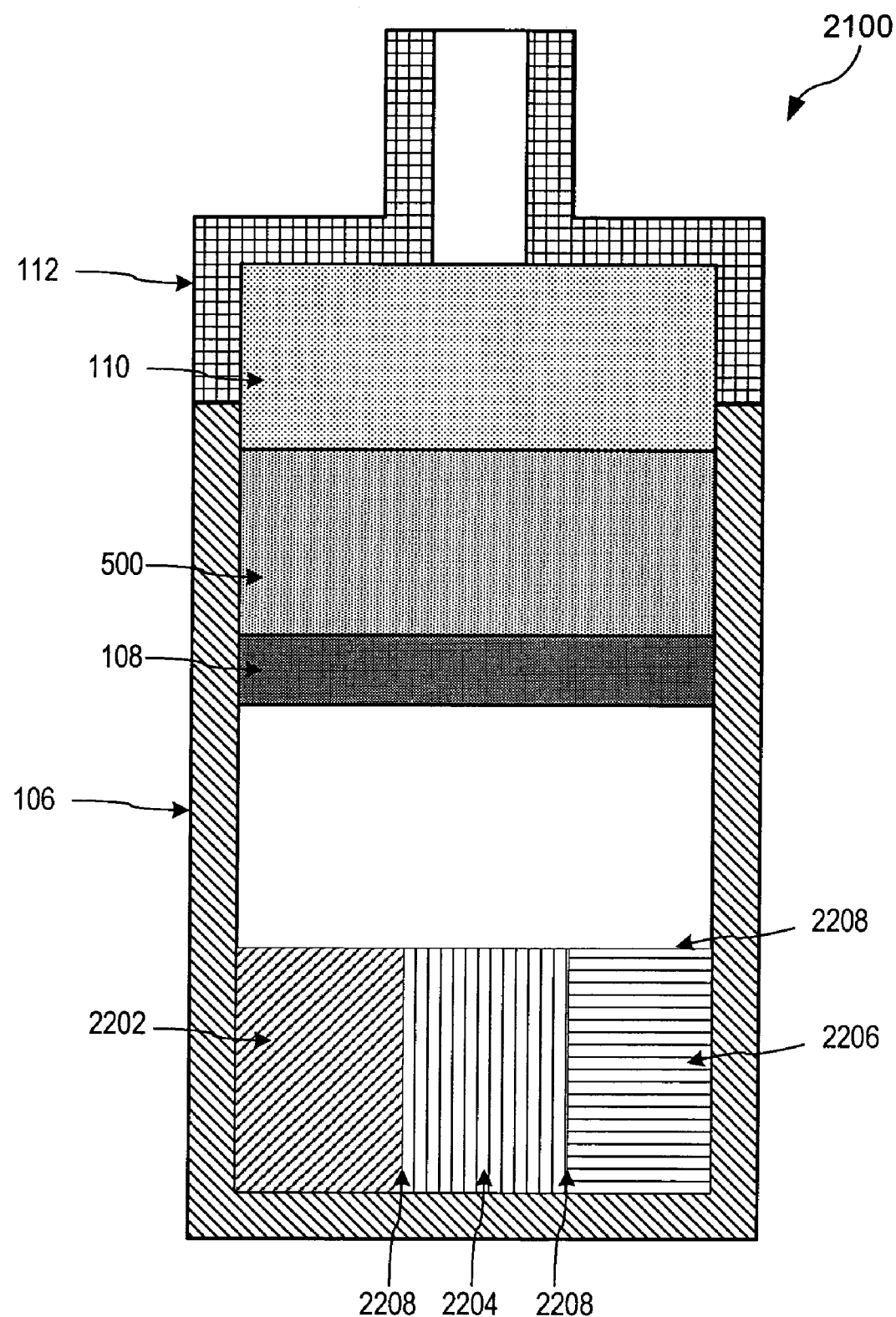
FIG. 22 depicts a side cross sectional view of another embodiment of a cartridge for one reaction chamber.

Referring to FIG. 22 of the drawings, the reference numeral 2200 generally designates a cartridge. The cartridge 2200 comprises a lid 112 and a reaction chamber 106.

When combined, the reaction chamber 106 and the lid 112 contain a filter 110, a foam breaker 500, a screen 108, water 2204, a gas producing agent 2202, and a catalyst 2206. The filter 110 and the foam breaker 500 are layered on top the screen 108, and the chemicals 2206, 2202, and 2204 are contained within the lower portion of the reaction chamber 106. The water 2204, the catalyst 2206, and the gas producing agent 2202 each rest at the bottom of the reaction chamber 106. Each of the chemicals 2202, 2204, and 2206 are separated from one another and held in place by a frangible seals 2208.

Upon activation, the frangible seals 2208 are broken. The chemicals 2202, 2204, and 2206 then mix to create a gas generating reaction. The gas produced traverses the screen 108, the foam breaker 500, and the filter 110 to exit the cartridge 2200.

Figures 23A, 23B:
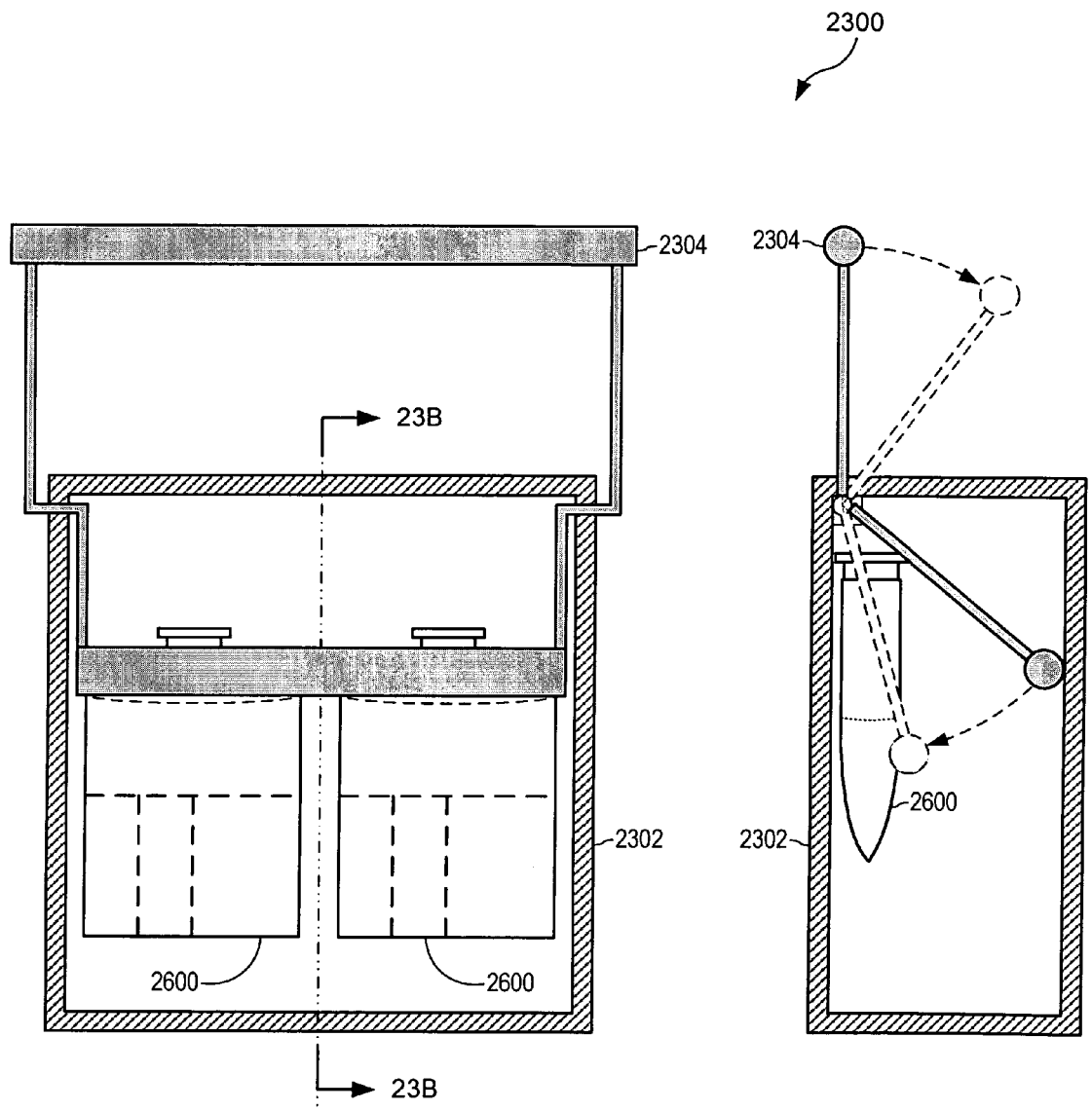
FIG. 23A depicts a cross-sectional front view of a container for containing pouch-type reaction chambers as depicted in FIGS. 26A and 26B, utilizing a mechanical lever to initiate the gas-generating reaction.
FIG. 23B depicts a cross-sectional side view of the container depicted in FIG. 23A, taken along the line 23A-23A.

Referring to FIGS. 23A and 23B of the drawings, the reference numeral 2300 generally designates a self-contained activation system. The system 2300 comprises a container 2302 and an activation handle 2304. The sealed unit 2302 is particularly adapted for containing one or more pouches 26000 or 2600', depicted in FIGS. 26A and 26B. However, sealed unit 2302 can also contain a multitude of devices, such as the configurations of FIGS. 1-3, 12-18, and 21-22, capable of releasing a gas. To initiate the release of a gas, the activation handle 2304 is displaced downwardly into an activation position to apply mechanical pressure to any of the multitude of devices to break any seals and initiate the chemical reaction(s). Additionally, the activation position of the handle 2304 can be reached by being displaced into either an upward or a downward position relative to the container 2302.

Figure 24A:
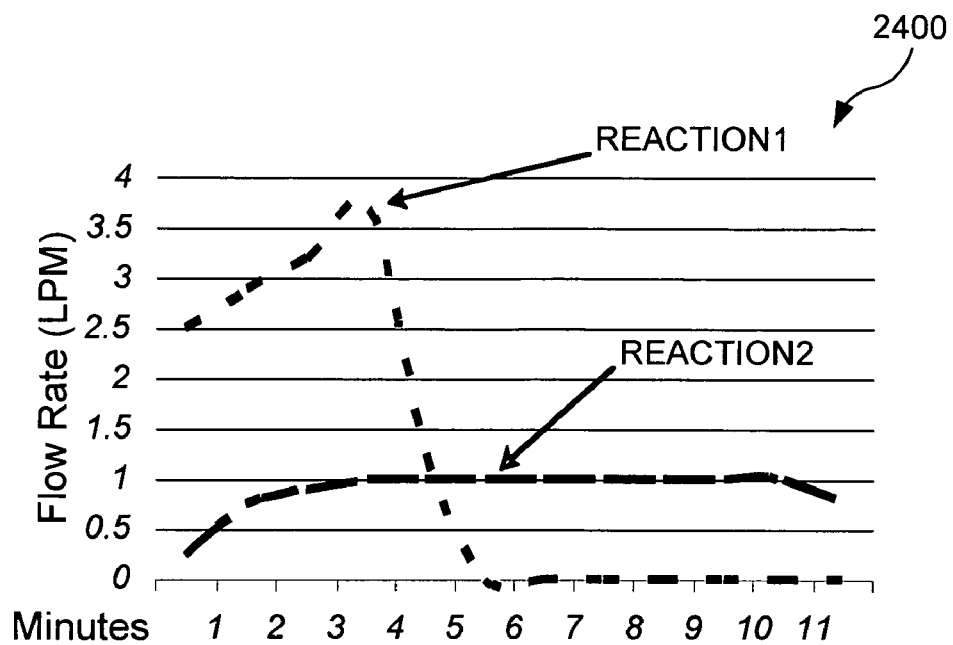
FIG. 24A is a diagram contrasting the flow rate of two gas producing reactions.

Referring to FIG. 24A of the drawing, the reference numeral 2400 generally designates a diagram contrasting two gas producing reactions. The first reaction (REACTION 1) is set up to produce a short reaction that starts high but is only maintained for a short period. The second reaction (REACTION 2) is set up to start slow but to be maintained for a longer period.

Considered individually, neither REACTION 1 in the first reaction chamber nor REACTION 2 in the second reaction chamber produce the desired flow rate profile. However, referring to FIG. 23B of the drawings, the reference numeral 2450 generally the combined output of REACTION 1 and REACTION 2. The combined output 2450 shows the sum of the combined reactions 1 and 2, and illustrates how the desired profile is achieved using 2 reaction chambers instead of one.

Similarly, other profiles can be achieved by two reaction chambers or multiple reaction chambers. For mining applications, for example, one possible flow rate profile is to simply maintain a reaction at an average of 2 liters per minute for 60 minutes.

Figure 25A:
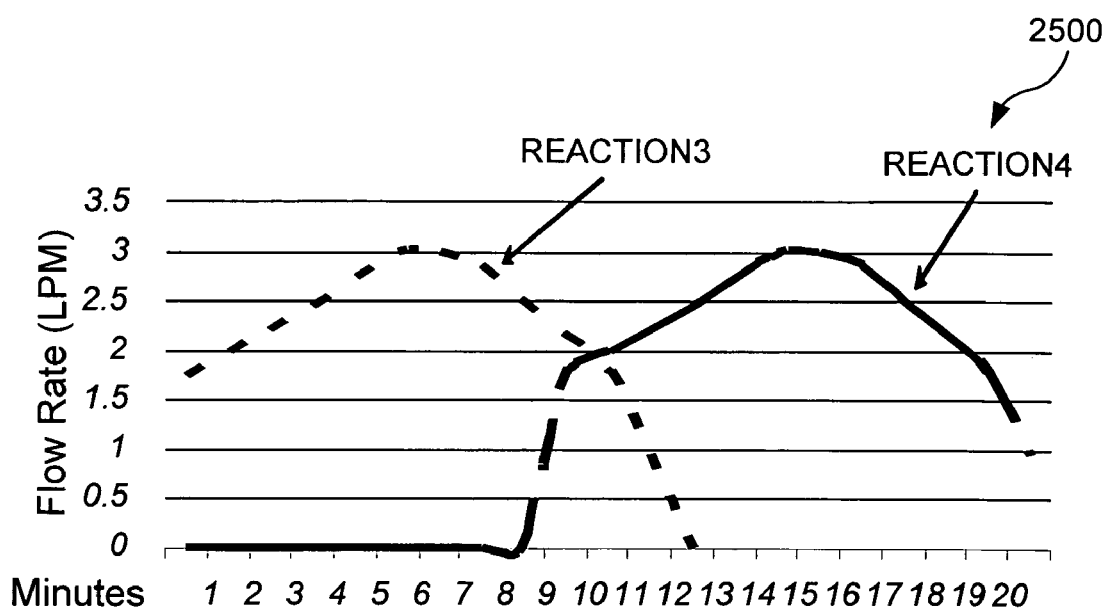
FIG. 25A is a diagram contrasting the flow rate of two gas producing reactions initiated at different times.

Another advantage of multiple reaction chambers is that the reactions can be staged to commence at different times in order to achieve a desired output. Referring to FIG. 25A of the drawings, the reference numeral 2500 generally designates a diagram showing two contrasted reactions. The diagram 2500 shows two identical reactions, REACTION 3 and REACTION 4, each with a reaction onset of 1.75 liters per minute. Each of REACTION 3 and REACTION 4 can take place in respective reaction chambers. In this case, the reactions are staged such that Reaction 3 commences at time=0 and runs for 12 minutes, while Reaction 4 commences at time=10 minutes.

Figure 25B:
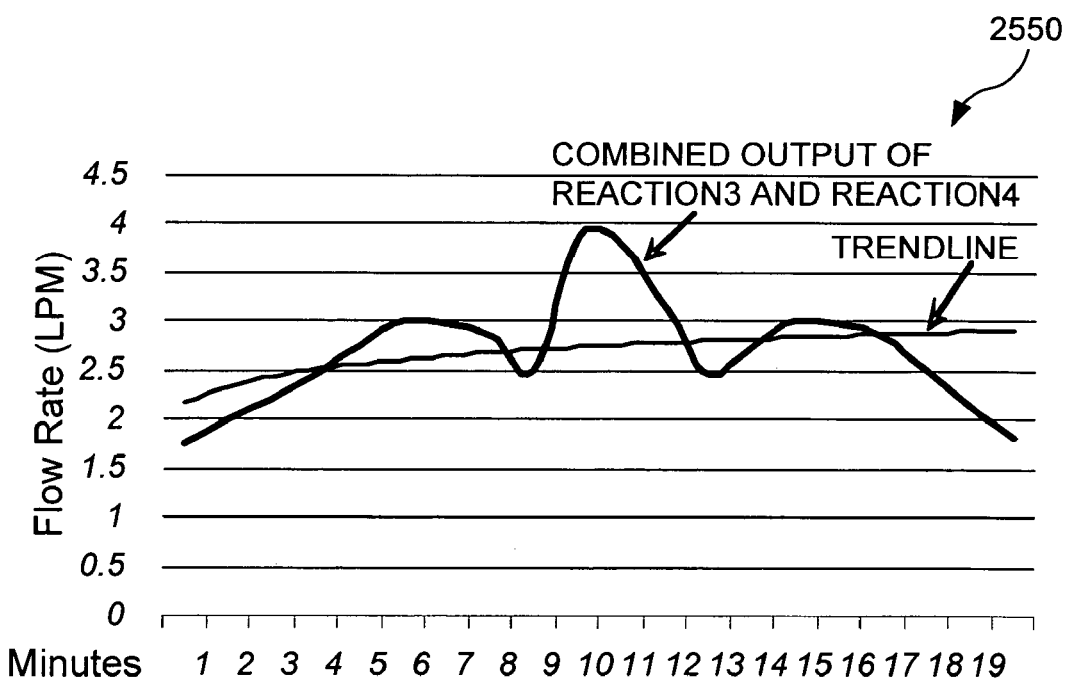
FIG. 25B is a diagram showing the combined flow rate of two gas producing reactions of FIG. 25A.

Referring to FIG. 25B of the drawings, the reference numeral 2550 shows a diagram depicting the combined outputs of REACTIONS 3 and 4. Considered individually, neither REACTION 3 in the first reaction chamber nor REACTION 3 in the second reaction chamber may produce the desired flow rate profile. However, the output of the combined reactions, shown in the diagram 2550 shows a 20-minute production with flow rates in a relatively narrow range, as the trend-line indicates.

By using multiple reaction chambers and/or staging reactions to commence at different times, a wide variety of flow rates, volume, time periods and performance profiles can be achieved, which allows for superior performance flexibility. This makes it possible for the current invention to cater effectively to a very broad range of applications, such as mining, aviation, emergency medical services, the military, emergency home use or any number of other applications on a worldwide basis, and to customize the flow rate profile that is optimum for the particular application.

Figure 26A:
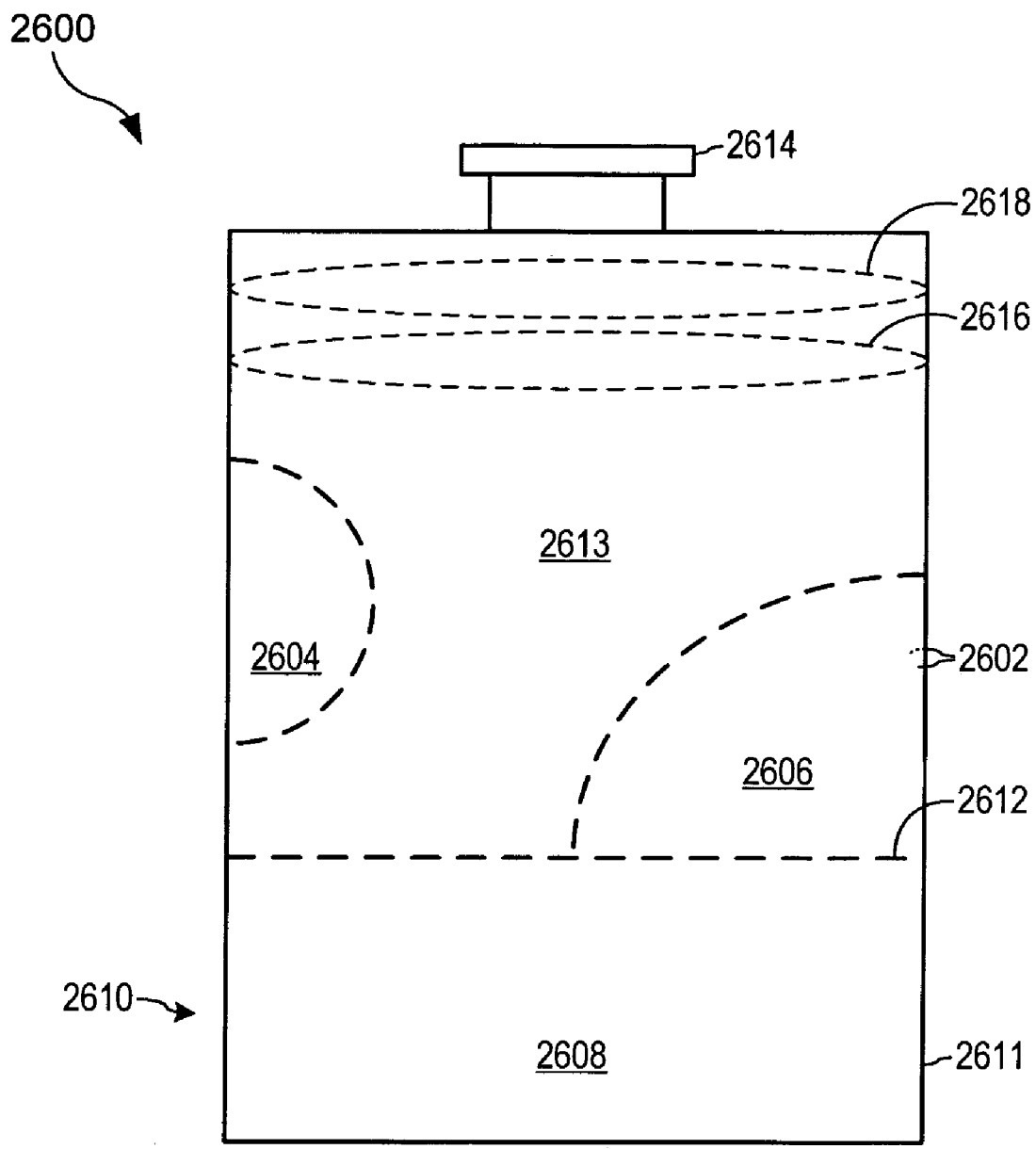
FIG. 26A depicts a pouch-type, self-contained, reaction chamber including separate compartments for the catalyst, gas/oxygen producing agent and water.

FIG. 26A depicts an embodiment of a planar sealed pouch that employs a method for storing the gas/oxygen releasing agent, the catalyst and the water all in one pouch. Planar sealed pouch 2600 is formed of a pair of sheets 2602 of air- and water-impermeable sheet material which is resistant to the basic chemicals commonly used (only the top sheet 2602 being visible in FIG. 26A). The sheet material 2602 supports the catalyst in compartment 2604, the gas/oxygen releasing agent in compartment 2606 and the water in compartment 2608. The sheet material must be resistant to the chemicals of the catalyst, gas/oxygen releasing agent and the water. In one embodiment, the sheet material is a laminate material that can be any combination of aluminum, polypropylene, polyethylene terephthalate, polyethylene, high density polyethylene, and any number of materials. The laminate material can also include a layer of insulating material. The pouch 2600 has a peripheral border 2611 which is sealed by convenient means, such as adhesive, ultrasonic welding, or heat sealing and is able to retain the pressures encountered without bursting.

Each of the compartments 2604, 2606 and 2608 also have internal sealed borders 2612 to retain their respective chemicals so that they stay initially separated. Unlike peripheral border 2611, sealed borders 2612 are sealed with a pressure-frangible adhesive to create "peel areas" between the top and bottom sheet material 2610. In this embodiment, the compartments 2604, 2606 and 2608 do not take up all of the area of the sheet material 2602, thus also defining an initially empty compartment 2607. For reasons to be explained, empty compartment 2607 may also be initially filled with air at ambient pressure.

The pouch 2600 accommodates nozzle element 2614, which can be made of suitable plastic such as polypropylenene, to permit the release of the oxygen or other gas produced. Because the gas produced may include entrained droplets of water or particulates from the catalyst and gas/oxygen producing agent, the pouch also includes self-contained permeable membrane/screen 2616 and a foam breaker 2618 that is retained by the membrane/screen 2616. When the gas/oxygen is produced, it will pass through the membrane/screen 2616 and the foam breaker 2618, where is effectively filtered, removing any entrained water droplets, bubbles or particulates before being exhausted from nozzle 2614 and directed through an appropriate conduit (not shown) to the user.

To use pouch 2600, force is applied to the outside of the pouch 2600, either directly or by means of the mechanism depicted in FIGS. 23A and 23B. This force causes internal pressure in the pouch, much like attempting to pop a balloon. Because the peripheral seal 2611 is pressure-resistant, seal 2611 does not burst. However, this internal pressure tends to cause sealed borders 2612 to peel apart, allowing the top and bottom sheets of the sheet material 2602 to separate and allowing the initially separated catalyst, gas/oxygen releasing agent and water to combine to create gas. It is believed that having some degree of air in initially empty compartment 2607 will tend to facilitate the peeling apart of these sealed borders 2612 by more evenly distributing the pressure, but this is not necessary to the invention.

Figure 26B:
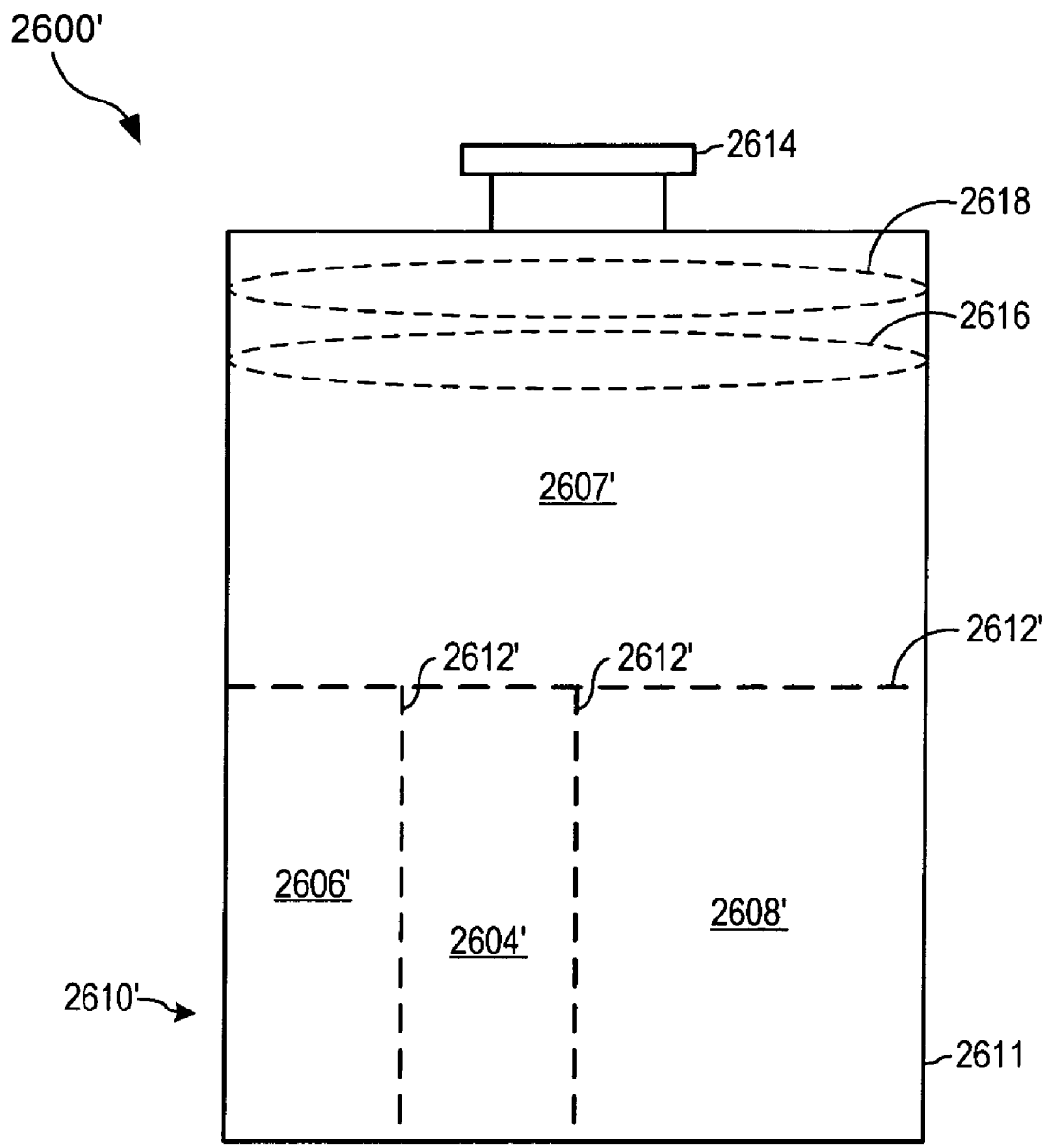
FIG. 26B depicts another embodiment of a pouch-type, self-contained, reaction chamber including differently shaped, separate compartments for the catalyst, gas/oxygen producing agent and water.

FIG. 26B depicts another embodiment of a pouch having compartments for initially separating the catalyst, oxygen producing agent and water. In FIG. 26B, pouch 2600' is similar to pouch 2600, the compartments 2604', 2606' and 2608' containing, respectively, the catalyst, oxygen producing agent and water, and the initially empty compartment 2607' containing air. In pouch 2600', however, each of the compartments have different shapes and locations. As in pouch 2600, each of the compartments is separated by pressure-frangible sealed borders 2612', constructed in the same manner.

The pouch 2600' accommodates nozzle element 2614, which can also be made of suitable plastic such as polypropylenene, to permit the release of the oxygen or other gas produced. Because the gas produced may include entrained droplets of water or particulates from the catalyst and gas/oxygen producing agent, the pouch also includes self-contained permeable membrane/screen 2616 and a foam breaker 2618, that is retained by the membrane/screen 2616, to filter the gas generated. Otherwise, the construction and operation of the pouch 2600' is the same as pouch 2600 and need not be further described.

Figure 24B:
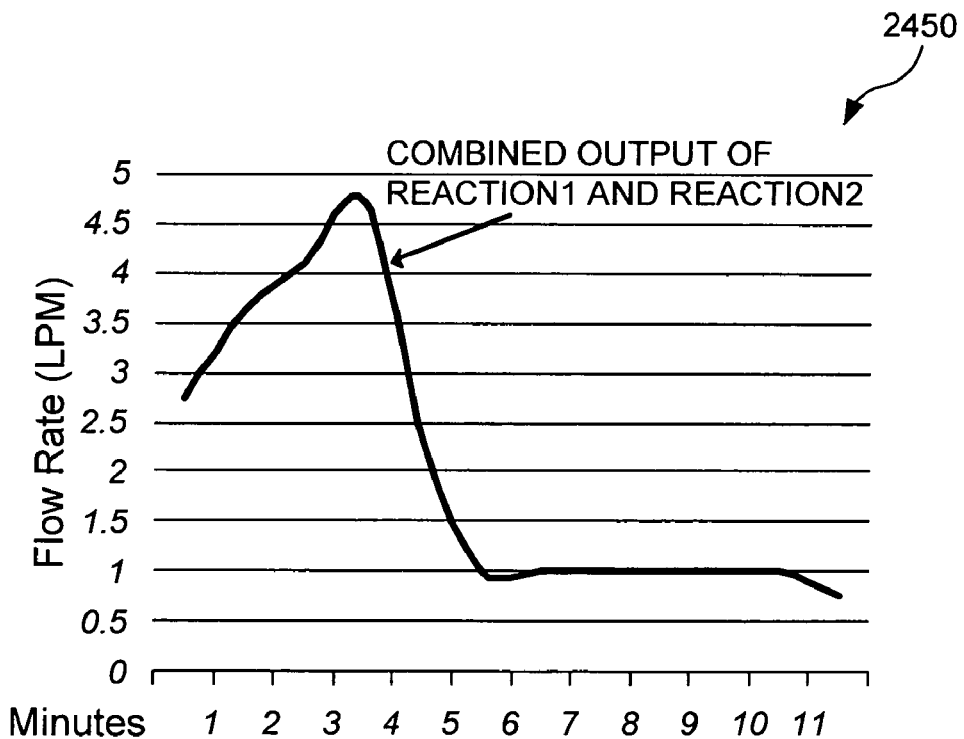
FIG. 24B is a diagram showing the combined flow rate of two gas producing reactions of FIG. 24A.

It should be noted that, as is the case with the multiple reaction chambers 106 depicted in FIG. 1, for example, multiple ones of pouches 2600 and/or 2600' may be connected to a common conduit and used together. Each of the pouches 2600 and/or 2600' can contain different compositions or proportions of the water, catalyst and gas/oxygen producing agent, as previously described, in order to create various flow profiles such as are depicted in FIGS. 24B and 25B.

It is understood that the present invention can take many forms and embodiments. Accordingly, several variations may be made in the foregoing without departing from the spirit or the scope of the invention. The capabilities outlined herein allow for the possibility of a variety of implementations. This disclosure should not be read as preferring any particular embodiments, but is instead directed to the underlying mechanisms on which these embodiments can be built. Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A method for producing a breathable oxygen stream from a portable apparatus, the method comprising:
   providing a first predetermined amount of water in a first upper containment chamber containing a first water seal,
   providing a first predetermined amount of oxygen releasing powder in a first oxygen releasing powder chamber positioned below the first water containment chamber,
   providing a first predetermined amount of catalyst in a first catalyst chamber positioned below the first water containment chamber and including a first catalyst seal,
   puncturing the first water seal to release the first predetermined amount of water from the first upper chamber into the first oxygen releasing powder chamber,
   puncturing the first catalyst seal to release the first predetermined amount of catalyst into the oxygen releasing powder chamber,
   generating a first oxygen flow in the oxygen releasing powder chamber from the releasing of the water and catalyst into the first oxygen releasing powder chamber,
   directing the first oxygen flow through a first foam breaker positioned in the first upper chamber,
   directing the first oxygen flow through a first filter positioned in the first upper chamber,
   providing a second predetermined amount of water in a second upper containment chamber containing a second water seal,
   providing a second predetermined amount of oxygen releasing powder in a second oxygen releasing powder chamber positioned below the second water containment chamber,
   providing a second predetermined amount of catalyst in a second catalyst chamber positioned below the second water containment chamber and including a second catalyst seal,
   puncturing the second water seal to release the second predetermined amount of water from the second upper chamber into the second oxygen releasing powder chamber,
   puncturing the second catalyst seal to release the second predetermined amount of catalyst into the oxygen releasing powder chamber,
   generating a second oxygen flow in the oxygen releasing powder chamber from the releasing of the water and catalyst into the second oxygen releasing powder chamber,
   directing the second oxygen flow through a second foam breaker positioned in the second upper chamber,
   directing the second oxygen flow through a second filter positioned in the second upper chamber,
   combining the first and second oxygen flows in a manifold,
   directing the first and second oxygen flows into a heat transmission pathway fluidly coupled to the manifold, the heat transmission pathway comprising a first curved tubular member,
   transferring heat from the first and second oxygen flows to a heat sink thermally coupled to the tubular member, and
   directing the first and second oxygen flows into a bubbler chamber fluidly coupled to the heat transmission pathway.

2. A method of generating oxygen in a portable apparatus, the method comprising:
   providing a first predetermined amount of water in a first upper containment chamber containing a first water seal,
   providing a first predetermined amount of oxygen releasing powder in a first oxygen releasing powder chamber positioned below the first water containment chamber,
   providing a first predetermined amount of catalyst in a first catalyst chamber positioned below the first water containment chamber and including a first catalyst seal,
   puncturing the first water seal to release the first predetermined amount of water from the first upper chamber into the first oxygen releasing powder chamber,
   puncturing the first catalyst seal to release the first predetermined amount of catalyst into the oxygen releasing powder chamber,
   generating a first oxygen flow in the oxygen releasing powder chamber from the releasing of the water and catalyst into the first oxygen releasing powder chamber,
   directing the first oxygen flow through a first foam breaker positioned in the first upper chamber,
   directing the first oxygen flow through a first filter fluidly coupled to the first upper chamber,
   providing a second predetermined amount of water in a second upper containment chamber containing a second water seal,
   providing a second predetermined amount of oxygen releasing powder in a second oxygen releasing powder chamber positioned below the second water containment chamber,
   providing a second predetermined amount of catalyst in a second catalyst chamber positioned below the second water containment chamber and including a second catalyst seal,
   puncturing the second water seal to release the second predetermined amount of water from the second upper chamber into the second oxygen releasing powder chamber,
   puncturing the second catalyst seal to release the second predetermined amount of catalyst into the oxygen releasing powder chamber, generating a second oxygen flow in the oxygen releasing powder chamber from the releasing of the water and catalyst into the second oxygen releasing powder chamber, directing the second oxygen flow through a second foam breaker positioned in the second upper chamber, directing the second oxygen flow through a second filter fluidly coupled to the second upper chamber, combining the first and second oxygen flows in a manifold.

3. The method of claim 2 further comprising:

directing the first and second oxygen flows into a heat transmission pathway fluidly coupled to the manifold, the heat transmission pathway comprising a first curved tubular member, transferring heat from the first and second oxygen flows to a heat sink thermally coupled to the tubular member, and directing the first and second oxygen flows into a bubbler chamber fluidly coupled to the heat transmission pathway.

4. The method of claim 2 further comprising:

providing an additional predetermined amount of oxygen releasing powder in an additional oxygen releasing powder chamber positioned below an additional water containment chamber, providing an additional predetermined amount of catalyst in an additional catalyst chamber positioned below the additional water containment chamber and including an additional catalyst seal, puncturing the additional water seal to release the additional predetermined amount of water from the additional upper chamber into the additional oxygen releasing powder chamber, puncturing the additional catalyst seal to release the additional predetermined amount of catalyst into the oxygen releasing powder chamber, generating an additional oxygen flow in the oxygen releasing powder chamber from the releasing of the water and catalyst into the additional oxygen releasing powder chamber, directing the additional oxygen flow through an additional foam breaker positioned in the additional upper chamber, directing the additional oxygen flow through an additional filter fluidly coupled to the additional upper chamber, and combining the additional oxygen flow with the first and second oxygen flows.

5. The method of claim 4 further comprising:

directing the additional oxygen flow into the heat transmission pathway fluidly coupled to the manifold, the heat transmission pathway comprising the first curved tubular member, transferring heat from the additional oxygen flow to the heat sink thermally coupled to the tubular member, and directing the additional oxygen flow into the bubbler chamber fluidly coupled to the heat transmission pathway.

6. The method of claim 2, wherein the first predetermined amount of water is substantially equal to the second predetermined amount of water.

7. The method of claim 2, wherein the first predetermined amount of water is substantially less than the second predetermined amount of water.

8. The method of claim 2, wherein the first predetermined amount of oxygen releasing powder is substantially equal to the second predetermined amount of oxygen releasing powder.

9. The method of claim 2, wherein the first predetermined amount of oxygen releasing powder is substantially less than the second predetermined amount of oxygen releasing powder.

10. The method of claim 2, wherein the first predetermined amount of catalyst is substantially equal to the second predetermined amount of catalyst.

11. The method of claim 2, wherein the first predetermined amount of catalyst is substantially less than the second predetermined amount of catalyst.

12. The method of claim 2, further comprising varying an amount of oxygen in the first oxygen flow by varying the first predetermined amounts of water, oxygen releasing powder, and catalyst provided.

13. The method of claim 2, further comprising varying an amount of oxygen in the second oxygen flow by varying the second predetermined amounts of water, oxygen releasing powder, and catalyst provided.

* * * * *